(12) United States Patent
Wittke

(10) Patent No.: US 10,433,009 B2
(45) Date of Patent: Oct. 1, 2019

(54) SYSTEMS AND METHODS FOR MANAGING SERIES RECORDINGS AS A FUNCTION OF STORAGE

(71) Applicant: Rovi Guides, Inc., San Carlos, CA (US)

(72) Inventor: David Gerald Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/251,827

(22) Filed: Aug. 30, 2016

(65) Prior Publication Data

US 2018/0063580 A1 Mar. 1, 2018

(51) Int. Cl.
| | | |
|---|---|---|
| H04N 21/231 | (2011.01) | |
| H04N 21/24 | (2011.01) | |
| H04N 21/258 | (2011.01) | |
| H04N 21/44 | (2011.01) | |
| H04N 21/442 | (2011.01) | |

(Continued)

(52) U.S. Cl.
CPC ......... *H04N 21/4435* (2013.01); *G06F 16/71* (2019.01); *G06F 16/743* (2019.01); *G06F 16/7867* (2019.01); *H04N 5/76* (2013.01); *H04N 21/4334* (2013.01); *H04N 21/4335* (2013.01); *H04N 21/4424* (2013.01); *H04N 21/44204* (2013.01); *H04N 21/458* (2013.01); *H04N 21/47214* (2013.01); *H04N 21/47217* (2013.01); *H04N 21/482* (2013.01)

(58) Field of Classification Search
CPC ............. H04N 21/23113; H04N 21/24; H04N 21/2401; H04N 21/2402; H04N 21/2405; H04N 21/2407; H04N 21/25808; H04N 21/27; H04N 21/274; H04N 21/2747; H04N 21/278; H04N 21/42646; H04N 21/42661; H04N 21/42669; H04N 21/433; H04N 21/4332; H04N 21/4334; H04N 21/4335
USPC .......................................................... 725/58
See application file for complete search history.

(56) References Cited

U.S. PATENT DOCUMENTS

| | | | |
|---|---|---|---|
| 2002/0012517 A1 | 1/2002 | Ichioka et al. | |
| 2004/0109668 A1 * | 6/2004 | Stuckman | H04N 5/782 |
| | | | 386/295 |

(Continued)

FOREIGN PATENT DOCUMENTS

EP          1580994 A2 *  9/2005  ............... H04N 5/76

*Primary Examiner* — Brian T Pendleton
*Assistant Examiner* — Jean D Saint Cyr
(74) *Attorney, Agent, or Firm* — Haley Guiliano LLP

(57) ABSTRACT

Systems and methods are presented for modifying scheduled storage of a series as a function of available storage. For example, a media guidance application (e.g., executed on a set-top box) monitors both the viewing progress of previously stored episodes of the series as well as the amount of available storage remaining on a storage device. The media guidance application then calculates, by inputting the current amount of available storage (e.g., 20% available) into a function of available storage, a threshold viewing progress (e.g., 50%). The media guidance application then determines from the viewing progress of the user through the episodes of the series whether the user has met the calculated threshold viewing progress (e.g., the user has watched 50% of the stored episodes). If the threshold viewing progress is not met, then the media guidance application modifies the series recording instruction (e.g., cancels the series recording).

14 Claims, 11 Drawing Sheets

(51) Int. Cl.
*H04N 21/443* (2011.01)
*G06F 16/71* (2019.01)
*G06F 16/74* (2019.01)
*G06F 16/78* (2019.01)
*H04N 21/433* (2011.01)
*H04N 21/458* (2011.01)
*H04N 21/472* (2011.01)
*H04N 21/482* (2011.01)
*H04N 5/76* (2006.01)
*H04N 21/4335* (2011.01)

(56) References Cited

U.S. PATENT DOCUMENTS

| | | | |
|---|---|---|---|
| 2005/0050578 A1* | 3/2005 | Ryal | 725/143 |
| 2005/0213931 A1* | 9/2005 | Kudara | H04N 5/76 |
| | | | 386/295 |
| 2006/0157249 A1* | 7/2006 | Reynolds | E21B 27/005 |
| | | | 166/311 |
| 2007/0154163 A1* | 7/2007 | Cordray | H04N 5/782 |
| | | | 386/278 |
| 2007/0157249 A1* | 7/2007 | Cordray | G06F 3/0482 |
| | | | 725/58 |
| 2008/0101763 A1 | 5/2008 | Bhogal et al. | |
| 2012/0141096 A1* | 6/2012 | Ellis | G11B 27/005 |
| | | | 386/297 |
| 2014/0233923 A1 | 8/2014 | Bradley et al. | |
| 2015/0334448 A1* | 11/2015 | Nishizawa | H04N 7/17318 |
| | | | 725/43 |

\* cited by examiner

SYSTEMS AND METHODS FOR MANAGING SERIES RECORDINGS AS A FUNCTION OF STORAGE

BACKGROUND

Given the plethora of media available to modern television consumers, users are often unable to view all the media assets they are interested in as they air live. Many users utilize digital video recorders ("DVRs"), which may be standalone devices or integrated into a set-top box ("STB") to record media assets for later consumption. In order to aid users, many set-top boxes implement media guidance applications that visually present information relating to media assets. One particular function common to many media guidance applications is a series recording function. Upon selection of the series recording function for a particular series by a user, the media guidance application stores an instruction to record episodes that are identified as being part of the series. As the media guidance application receives updated media asset listings (e.g., from a content provider) the media guidance application automatically schedules the media assets detected as episodes of the series and records them at the appropriate time.

While convenient, series recordings can quickly lead to the storage capacity of a DVR being reached. This can frustrate a user as he or she may have to go through a large number of media assets and manually determine which to delete in order to store new media assets. A variety of solutions to this problem have been proposed, such as automatically deleting media assets after a threshold amount of time stored or after a user has watched the media asset. To address the problem of the large number of series recording instructions that led to the DVR reaching storage capacity, one previously proposed solution contemplated was to determine the number of episodes of the series watched by a user and delete the series recording instruction based on the user not viewing a threshold number of the episodes. However, this solution is problematic in that it is a one size fits all approach that assumes that a user not watching a threshold number of episodes means they are not interested in the series. Some users may prefer to wait to view a series until every episode of a season has been recorded or they may not be worried about watching episodes immediately if their DVR is not full.

SUMMARY

Accordingly, systems and methods are presented for modifying scheduled storage of a series as a function of available storage. For example, a media guidance application (e.g., executed on a set-top box) monitors both the viewing progress of previously stored episodes of the series as well as the amount of available storage remaining on a storage device. The media guidance application then calculates, by inputting the current amount of available storage (e.g., 20% available) into a function of available storage, a threshold viewing progress (e.g., 50%). The media guidance application then determines from the viewing progress of the user through the episodes of the series whether the user has met the calculated threshold viewing progress (e.g., the user has watched 50% of the stored episodes). If the threshold viewing progress is not met, then the media guidance application modifies the series recording instruction (e.g., cancels the series recording). By utilizing variable thresholds for when to modify the series recording instruction based on the amount of available storage, the systems and methods may help ensure that a series recording instruction is not deleted prematurely and help to more efficiently manage the finite amount of space available on a storage device.

In some aspects, the media guidance application receives a user request to store a series. For example, the media guidance application may receive a user selection, via a user input interface (e.g., a remote control), of a recording option for an episode of a series. The media guidance application may then provide additional options to the user, including a selectable option to record other episodes of the series. Alternatively or additionally, the media guidance application may provide a series recording option screen with a plurality of popular series that the user may select with a single input via a user input interface (e.g., a touch screen).

The media guidance application then stores an instruction to store episodes of the series in a scheduling data structure. For example, the media guidance application may maintain a scheduling data structure stored in storage either locally in memory or remotely at a media guidance data source. The scheduling data structure may be organized as a table, where each instruction is stored in a different row and parameters associated with the instruction (e.g., start time to record, end time, and/or source) are stored in fields in the row. Alternatively or additionally, the scheduling data structure may be structured as an object of a class, as is typical of object-oriented programming languages such as C++. In this case, the class may be a "scheduled item" class, which creates a general template of variables and constants that are stored in memory for each scheduling selection received by the media guidance application from a user. For an instruction to store a series, the media guidance application may either generate separate instructions to store each episode, or a single instruction that specifies every episode corresponding to a particular series should be stored.

The media guidance application, based on the instruction to store episodes of the series, stores a plurality of episodes of the series on a storage device. For example, the media guidance application may execute a program script which compares the clock time with start times stored in the scheduling database for various scheduling events. When the clock time corresponds to the start time of a scheduling event, the media guidance application may take the appropriate action (e.g., receive data from a particular source as defined in the scheduling data structure and store the data).

The media guidance application stores viewing progress of the plurality of episodes by the user in a user profile corresponding to the user. For example, the media guidance application may maintain a user profile in a data structure. The user profile may be per user (e.g., a user is identified by the media guidance application based on login credentials and separate viewing progress for each user is maintained) or per device (e.g., even if a device has multiple users that view a media asset, only a single viewing progress is stored by the media guidance application). The data structure that stores the user profile may be organized similarly to the scheduling data structure described above. For example, the media guidance application may organize the user profile as a table, where each media asset the user has consumed is stored in a different row and parameters associated with the media asset (e.g., the user's viewing progress and/or what time and date the media asset was last accessed) are stored in fields in the row. Each time the user accesses a particular media asset, the media guidance application may query the user profile to determine whether the media asset has been accessed previously by the user and update the viewing progress for the entry corresponding to the media asset. If the user has not previously viewed the media asset, the media guidance application may create a new entry in the user profile.

In some embodiments, the media guidance application determines the user has selected a first episode of the plurality of episodes. For example, the media guidance application may determine that the user has selected a first episode, "The Winds of Winter" of the series, "Game of Thrones," based on metadata associated with "The Winds of Winter," (e.g., received from a media guidance data source). The media guidance application then monitors a current playback position of the user for the first episode. For example, the media guidance application may monitor the viewing progress of the user viewing "The Winds of Winter" and determine that the user has viewed 15 minutes of the episode. The media guidance application stores the current playback position of the user for the first episode as an entry in a viewing progress data structure of the user profile. For example, the media guidance application may update a field corresponding to the viewing progress in the user profile for the episode periodically, or once the media guidance application determines the user is no longer viewing the media asset.

In order to store the current playback position of the user for the first episode as an entry in a viewing progress data structure of the user profile, the media guidance application may calculate a fraction of the first episode viewed by the user based on a duration of the first episode and the current playback position of the user. For example, the media guidance application may retrieve the current playback progress (e.g., 15 minutes) for the episode, "The Winds of Winter" of the series, "Game of Thrones" by the user. The media guidance application may then calculate the fraction of "The Winds of Winter" viewed by the user as ¼ based on retrieving the total duration of the episode as 60 minutes (e.g., from a media guidance data source). The media guidance application then retrieves a threshold fractional viewing progress stored in memory. For example, the media guidance application may retrieve the value of the threshold fractional viewing progress as ½ from a field in the user profile. The value for the threshold fractional viewing progress may be user or device specific. The media guidance application compares the fraction of the first episode viewed by the user to the threshold fractional viewing progress. For example, the media guidance application may compare the values of the threshold fractional viewing progress (e.g., ½) to the fraction of the first episode viewed by the user (e.g., ¼) to determine which is greater. The media guidance application, in response to determining the fraction of the first episode viewed by the user meets the fractional viewing progress, stores with the entry an indication that the first episode has been completely viewed by the user. For example, upon determining that the user has viewed more than the threshold, the media guidance application may set a Boolean value corresponding to whether the user has viewed the episode to "true." Alternatively or additionally, the media guidance application may allow the user to customize (e.g., via a user input interface) the threshold fractional viewing progress to what they consider to be an episode that they have viewed, as some users may only want to watch portions of one or more episodes, but are still interested in the series.

The media guidance application determines an amount of available storage remaining on the storage device. For example, the media guidance application may determine how many blocks of memory are free and available to store media assets. The media guidance application may process the amount of available storage such that it can be input into the series viewing function, as described below. For example, the media guidance application may divide the total free blocks of memory by the total blocks of memory to determine a percentage of space available to store new media assets (e.g., 5% available).

The media guidance application calculates a threshold viewing progress by processing the amount of available storage with a series viewing function. For example, the media guidance application may store a mathematical function that relates the amount of available storage to a threshold viewing progress. The mathematical function may be continuous, discontinuous, and/or single-valued. As a specific example, the media guidance application may determine that only 10% of the storage of the storage device is available and input this into the mathematical function, which returns an output of ⅞. In this example, the media guidance application calculates a high threshold viewing progress since very little storage space is available. In some embodiments, the media guidance application retrieves a first value of the amount of available storage. As described above, the media guidance application may retrieve the value of blocks of memory free and available to store media assets. The media guidance application then executes a program script, wherein the first value is input to a mathematical function mapping values for the amount of available storage to threshold viewing progresses. For example, the media guidance application may execute a program script (e.g., a C++ program) with the amount of memory available as an input to a mathematical function, as described above. The media guidance application receives, as an output of the program script, the threshold viewing progress. For example, the program script may return a threshold viewing progress based on the amount of available storage input and terminate.

The media guidance application computes an aggregated viewing progress representing a collective viewing progress among the plurality of stored episodes. For example, the media guidance application may execute a database query language script, such as an SQL script, to retrieve the viewing progress for specific media assets the user has viewed (e.g., entries in a table in the user profile). The media guidance application may then sum the viewing progress for each episode to determine an aggregated viewing progress by the user for the series.

In some embodiments, the media guidance application calculates an aggregated duration of stored episodes of the series by summing a duration of each stored episode of the plurality of stored episodes of the series. For example, the media guidance application may retrieve the total duration (e.g., runtime) of each episode from a field in the user profile or from a media guidance data source. In the latter case, the media guidance application may query the media guidance data source, which may be located remotely and accessible via a communications network, for the total duration of an episode by executing a program script with an identifier of the episode as a parameter. As a specific example, the media guidance application may determine the user has stored 6 episodes of a series and 360 combined minutes of the episodes (e.g., the aggregated duration).

In addition to calculating the aggregated duration of stored episodes, the media guidance application also calculates the collective viewing progress by summing a current playback progress of the user of each stored episode of the plurality of stored episodes of the series. For example, the media guidance application may execute a database query language script, such as an SQL script, to retrieve the viewing progress for specific media assets the user has viewed (e.g., entries in a table in the user profile) that are a part of the series. In this example, the media guidance application may maintain an integer variable or series of variables that represent the total duration viewed by the user and update it by adding the viewing progress of each entry in the user profile that corresponds to the series retrieved by the media guidance application. As a specific example, the media guidance application may determine the user has viewed 5 episodes of a series and 120 combined minutes of the episodes (e.g., the collective viewing progress). The media guidance application then calculates the aggregated viewing progress by dividing the collective viewing progress by the aggregated duration of stored episodes. For example, the media guidance application may retrieve the values for the calculated aggregated duration and the collective viewing progress from memory and compute the aggregated viewing progress by dividing the two values. As a specific example, the media guidance application may divide the 120 minutes viewed by the user by the 360 total minutes of the series stored in memory of the storage device for an aggregated viewing progress of 33%.

The media guidance application determines whether the aggregated viewing progress exceeds the threshold viewing progress. For example, the media guidance application may compare values for the aggregated viewing progress and the threshold viewing progress to determine whether the aggregated viewing progress exceeds the threshold (e.g., by subtracting one value from the other and determining whether the result returned is positive, negative, or zero). As a specific example, the media guidance application may determine that the aggregated viewing progress is 33% which does not meet the threshold of 50% which was calculated from the amount of storage available on the storage device as described above.

The media guidance application, in response to determining the aggregated viewing progress does not exceed the threshold viewing progress, modifies the instruction to store episodes of the series. For example, the media guidance application may access the scheduling data structure and write (e.g., by executing a program script) a new instruction to store fewer episodes, or to delete the instruction to store episodes of the series entirely, as described further in various embodiments below.

The media guidance application may modify the instruction to store episodes of the series in a variety of ways. In some embodiments, the media guidance application accesses the scheduling data structure. For example, the media guidance application may access the scheduling data structure stored locally in memory or remotely at a media guidance data source. The media guidance application may be required to transmit an authorization code, which may be obtained from user input, in order to access the scheduling data structure. The media guidance application then stores an additional instruction to store a subset of episodes of the series. For example, the media guidance application may execute a program script which writes, to a field in the row in the scheduling data structure for a specific instruction to store a series, an additional instruction to store a subset of episodes. The subset may be every other episode, only new episodes, only high-definition episodes, or any other grouping that does not include every episode of the series that is received by the media guidance application.

In other embodiments, the media guidance application accesses the scheduling data structure. For example, as described above, the media guidance application may access the scheduling data structure stored locally in memory or remotely at a media guidance data source. The media guidance application then deletes the instruction to store episodes of the series. For example, the media guidance application may execute a program script which deletes the row in the scheduling data structure for a specific instruction to store the series.

After deleting the instruction to store episodes of the series, the media guidance application may additionally retrieve the current playback progress for each stored episode of the plurality of stored episodes from a viewing progress data structure of the user profile. For example, the media guidance application may access a data structure in the user profile containing the viewing progress of a user for a plurality of media assets (e.g., arranged in a table) and retrieve the playback progress for each episode identified as part of the series (e.g., from a series field listing a series identifier for the episode).

The media guidance application then ranks the plurality of stored episodes based on the retrieved current playback progress of each stored episode. For example, as the media guidance application retrieves the playback progress for each episode (e.g., by executing a program script utilizing a "for-loop" to check the contents of each consecutive row in the table to see whether it is an episode of the series) the media guidance application may store the retrieved viewing progress for each episode in a data structure with only episodes of the series (e.g., an array, list, table, etc.). Either while retrieving or after retrieving the viewing progress for the episodes of the series, the media guidance application may sort the contents of the data structure with only episodes of the series using any sorting algorithm (e.g., "merge sort") such that they are ordered based on the viewer's progress in each episode (e.g., an episode the user has watched 10 minutes of will be ranked higher than an episode the user has completed). The media guidance application then deletes a first stored episode based on the ranking. For example, the media guidance application may delete an episode corresponding to the first or last entry of the ranked data structure containing only episodes of the series, depending on how the viewing progresses were ranked. In this way, the media guidance application can selectively delete the episode that has either been viewed the most or the least by the user from the storage device.

Additionally, the media guidance application may calculate a new amount of available storage remaining on the storage device based on deleting the first stored episode. For example, as described above, the media guidance application may determine how many blocks of memory are free and available to store media assets. The media guidance application may then calculate a second threshold viewing progress by processing the new amount of available storage with the series viewing function. For example, as described above, the media guidance application may store a mathematical function that relates the amount of available storage to a threshold viewing progress. The media guidance application may input the new amount of storage available into a program script which operates on the input with the mathematical function and returns the second threshold viewing progress. The media guidance application may then determine whether the aggregated viewing progress exceeds the second threshold viewing progress. For example, as described above, the media guidance application may compare values for the aggregated viewing progress and the second threshold viewing progress to determine whether the aggregated viewing progress exceeds the second threshold (e.g., by subtracting one value from the other and determining whether the result returned is positive, negative, or zero).

The media guidance application may then, in response to determining the aggregated viewing progress does not exceed the second threshold viewing progress, delete a second stored episode based on the ranking. For example, the media guidance application may delete a second episode corresponding to the first or last entry of the ranked data structure containing only episodes of the series, depending on how the viewing progresses were ranked. In some embodiments, the media guidance application may continue to delete episodes from storage based on the ranked list until the media guidance application determines the aggregated viewing progress exceeds a calculated threshold.

In some embodiments, the media guidance application generates for display a notification indicating the aggregated viewing progress of the user including an option to modify the instruction to store episodes of the series. For example, the media guidance application may generate for display on a television that the user has only viewed 25% of the episodes of a particular series and may additionally present options to modify the instruction. The options to modify the instruction may include an option to delete the instruction to store episodes of the series, an option to delete episodes the user has watched (e.g., either watched a certain percentage of or accessed), and/or an option to store only a subset of the series, as described above. The media guidance application receives a user selection by the user of the option. For example, the media guidance application may receive a user selection, via a user input interface, of the option to delete the instruction to store episodes of the series. In some embodiments, the user can select multiple options to allow for greater flexibility in how the finite amount of storage on the storage device is used. For example, the user may select to delete episodes of which they have watched 50%, as well as to only store new episodes of the series. The media guidance application then modifies the instruction to store episodes of the series based on the received user selection. For example, as described above, the media guidance application may access the scheduling data structure and write (e.g., by executing a program script) a new instruction (e.g., into a field of the row for the existing instruction) based on the received user selection.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
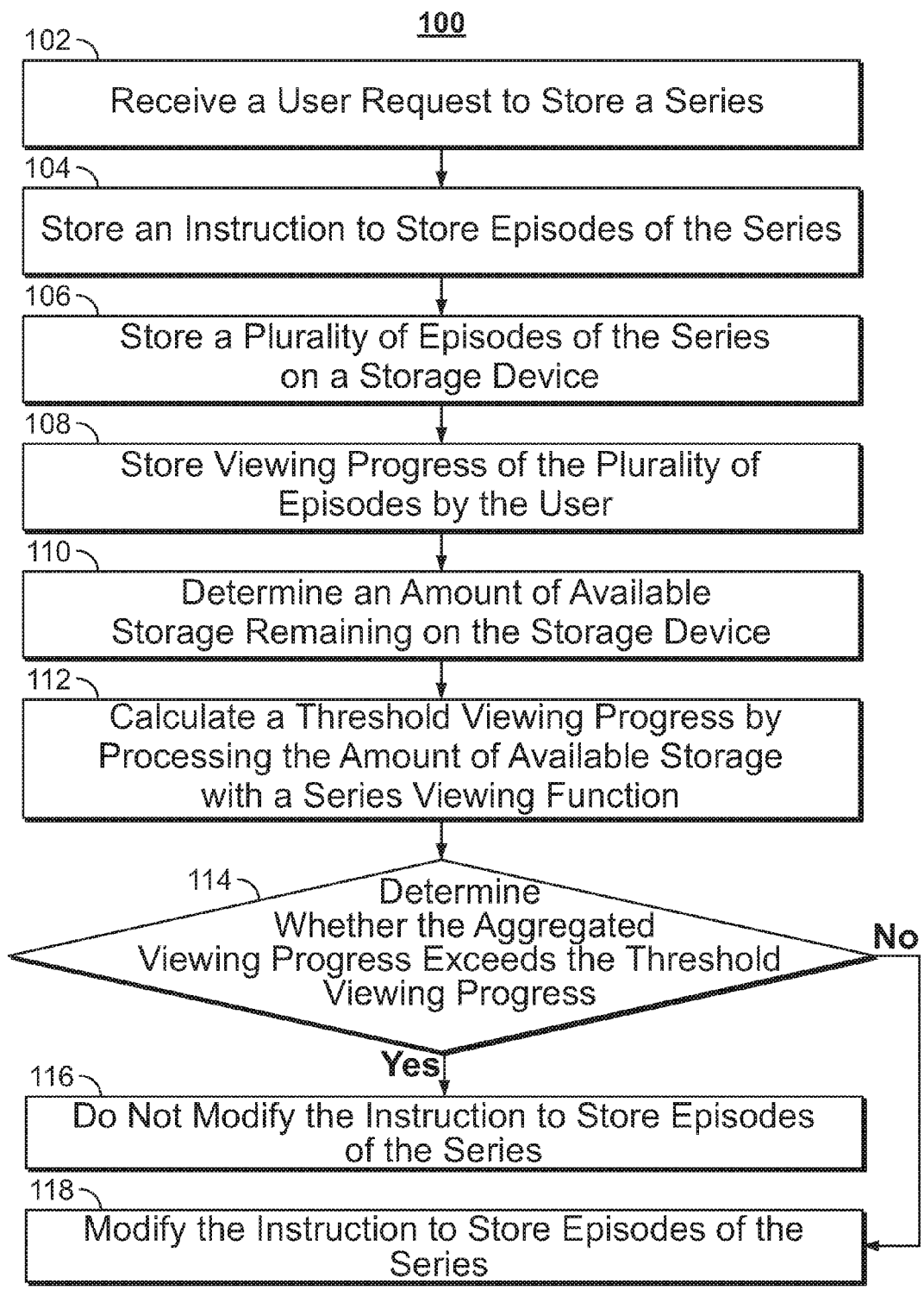
FIG. 1 is a flowchart of illustrative steps for modifying scheduled storage of a series as a function of available storage, in accordance with some embodiments of the disclosure.

Systems and methods are presented for modifying scheduled storage of a series as a function of available storage. For example, a media guidance application (e.g., executed on a set-top box) monitors both the viewing progress of previously stored episodes of the series as well as the amount of available storage remaining on a storage device. The media guidance application then calculates, by inputting the current amount of available storage (e.g., 20% available) into a function of available storage, a threshold viewing progress (e.g., 50%). The media guidance application then determines from the viewing progress of the user through the episodes of the series whether the user has met the calculated threshold viewing progress (e.g., the user has watched 50% of the stored episodes). If the threshold viewing progress is not met, then the media guidance application modifies the series recording instruction (e.g., cancels the series recording). By utilizing variable thresholds for when to modify the series recording instruction based on the amount of available storage, the systems and methods may help ensure that a series recording instruction is not deleted prematurely and help to more efficiently manage the finite amount of space available on a storage device.

As referred to herein, a "media guidance application," or an "interactive media guidance application" or, sometimes, a "media guidance application" or a "guidance application" is an application that allows a user to consume, and/or navigate to, media assets. In some embodiments, the media guidance application may be provided as an online application (i.e., provided on a website), or as a stand-alone application on a server, user device, etc. In some embodiments, the media guidance application may be executed on the first device and a second device simultaneously, or at a location remote from either device (e.g., a remote server), or any suitable combination. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM"), etc.

In some embodiments, the media guidance application receives a user selection of an option to store an episode of a series. For example, the media guidance application may receive a user selection, via a user input interface (e.g., a remote control), of a recording option for an episode of the series, "Game of Thrones." The media guidance application then stores an instruction to store the episode of the series in a scheduling data structure. For example, the media guidance application may maintain a scheduling data structure stored in storage either locally in memory or remotely at a media guidance data source. The scheduling data structure may be organized as a table, where each instruction is stored in a different row and parameters associated with the instruction (e.g., start time to record, end time, and/or source) are stored in fields in the row.

The media guidance application then queries a scheduling data structure for stored instructions to store other episodes of the series. For example, the user may have requested to store individual episodes of "Game of Thrones" each week for the past five weeks as reflected by five different entries in the scheduling data structure, one for each episode. The instructions may be stored in separate rows of the scheduling data structure, as described above.

The media guidance application compares an identifier of the series that the user has selected to store an episode of with series identifiers for each entry in the scheduling data structure to identify a number of similar scheduling instructions. For example, the identifier of the newly received request may be the series title, "Game of Thrones" and may be compared with other series titles stored in the scheduling data structure. As another example, the identifier could be a time-channel combination (e.g., a user has set many recordings of different media assets that are on at 5 pm on channel 7), a genre (e.g., drama), a unique combination of characters (e.g., a media asset serial number identifying the series, such as "AHDL1820"), or any other method of comparing the metadata of entries in the scheduling data structure with the newly selected episode. The media guidance application may maintain a counter as it iterates through and compares the metadata of scheduling instructions to the newly scheduled instruction and increment the counter when the identifier of the series matches the identifier of a stored entry in the scheduling data structure.

Based on determining that the number of similar scheduling instructions exceeds a threshold number, the media guidance application modifies the instruction to store the episode of the series to an instruction to store a plurality of episodes of the series. For example, the media guidance application may determine that since the user has set five individual episode storage instructions for "Game of Thrones," the user is interested in recording every episode of "Game of Thrones" (e.g., the five storage instructions exceeds the threshold number). The media guidance application may then access the entry in the scheduling data structure for storing the episode of "Game of Thrones" and convert it to a series storage instruction (e.g., by setting a "series" flag to "true"). In some embodiments, the media guidance application may modify the instruction by creating a new instruction to store the series. In other embodiments, the media guidance application may modify the instruction by storing only a subset of the episodes of the series. For example, the media guidance application may record only "high-definition" episodes. As another example, the media guidance application may identify a pattern (e.g., the user records a media asset every other week because they work night shifts every other week) and modify the instruction based on the identified pattern.

Figure 6:
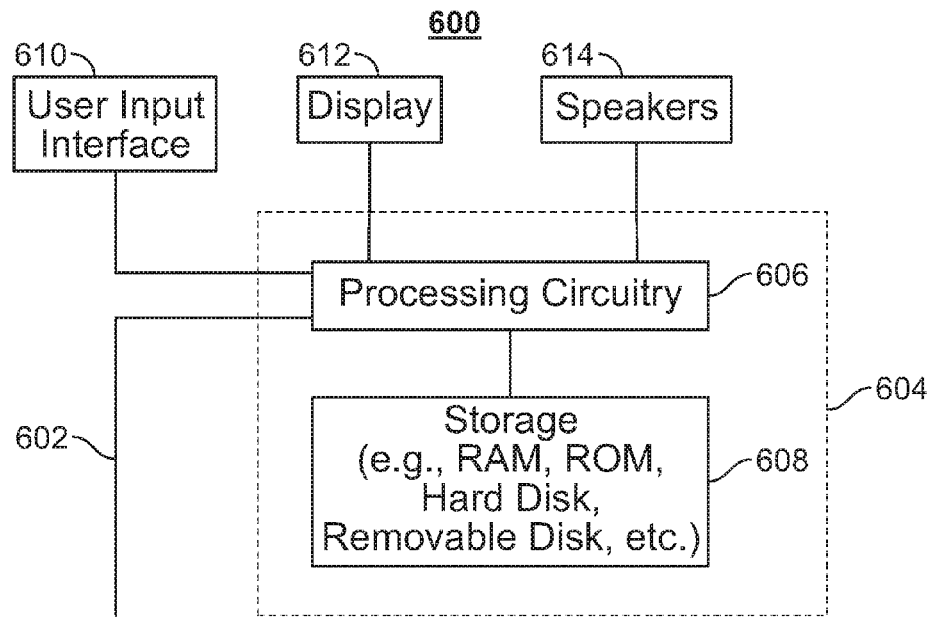
FIG. 6 is a block diagram of an illustrative user equipment device in accordance with some embodiments of the disclosure.

FIG. 1 is a flowchart of illustrative steps for modifying scheduled storage of a series as a function of available storage, in accordance with some embodiments of the disclosure. For example, a media guidance application implementing process 100 may be executed by control circuitry 604 (FIG. 6). It should be noted that process 100 or any step thereof could be performed on, or provided by, any of the devices shown in FIGS. 6-7.

Process 100 begins at 102, where the media guidance application receives (e.g., via control circuitry 604 (FIG. 6)) a user request to store a series. For example, the media guidance application (e.g., via control circuitry 604 (FIG. 6)) may receive a user selection of an option to store all new episodes of the program series "Game of Thrones" via a user input interface (e.g., via user input interface 610 (FIG. 6)). The user may select the option to store the series in a program listing screen (e.g., in a grid guide (FIGS. 4-5)), through a series recording option for Game of Thrones, remotely from the set-top box using a mobile device, or any other method for selecting programs to be stored.

As referred to herein, "a series" should be understood to mean any multiple media assets that are related and grouped by a common criterion. The criterion may comprise any or multiple of: actor, episode title, series title, genre, release date, keywords, director, writer, studio, and/or producer. In some embodiments, the series may comprise a plurality of episodes that are ordered. For example, episodes of the series "Game of Thrones" are serial in that they aired and written to be viewed in a certain order. In other embodiments, the series may comprise a plurality of standalone episodes. As referred to herein, "an episode" should be understood to mean any singular media asset that is a part of a series. In some embodiments, an episode may refer to a media asset scheduled at a particular time regularly from a content source. For example, an episode of the series "Game of Thrones" may air at 9 pm from the same content source weekly.

Process 100 continues to 104, where the media guidance application stores (e.g., via control circuitry 604 (FIG. 6)) an instruction to store episodes of the series. For example, the media guidance application may maintain a scheduling data structure stored in storage (e.g., storage 608), or remotely at a media guidance data source (e.g., media guidance data source 718) accessible via a communications network (e.g., communications network 714)). The scheduling data structure may be organized as a table, where each instruction is stored in a different row and parameters associated with the instruction (e.g., start time to record, end time, and/or source) are stored in fields in the row. As a specific example, the media guidance application may execute (e.g., via control circuitry 604 (FIG. 6)) a program script to write a new entry in the scheduling data structure in response to the user selecting to store the series "Game of Thrones." The new entry may include separate fields with parameters associated with the instruction to store episodes of "Game of Thrones," such as: "type=series," "source=HBO," "start time=9 pm," and/or "end time=10 pm."

Process 100 continues to 106, where the media guidance application stores (e.g., via control circuitry 604 (FIG. 6)) a plurality of episodes of the series on a storage device. For example, the media guidance application may execute (e.g., via control circuitry 604 (FIG. 6)) a program script which compares the clock time with start times stored in the scheduling database for various scheduling events. When the clock time corresponds to the start time of a scheduling event, the media guidance application may take the appropriate action (e.g., receive data from a particular source as defined in the scheduling data structure and store the data). As referred to herein, "store" should be understood to mean any methods or systems for preserving a media asset persistently, such that a user can access the media asset after its original transmission. In some embodiments, storing a media asset may be performed by a set-top box or other user equipment recording the media asset from the content source transmitting the media asset. In other embodiments, storing a media asset may be performed by downloading a copy of the media asset from a remote server via a communications network.

Process 100 continues to 110, where the media guidance application determines (e.g., via control circuitry 604 (FIG. 6)) an amount of available storage on the storage device. For example, the media guidance application may determine (e.g., via control circuitry 604 (FIG. 6)) how many blocks of memory are free (e.g., currently unused to store data) and thus available to store media assets. The media guidance application may process (e.g., via control circuitry 604 (FIG. 6)) the amount of available storage such that it can be input into the series viewing function, as described below. For example, the media guidance application may divide the total free blocks of memory by the total blocks of memory to determine a percentage of space available to store new media assets (e.g., 5% available).

Process 100 continues to 112, where the media guidance application calculates (e.g., via control circuitry 604 (FIG. 6)) a threshold viewing progress by processing the amount of available storage with a series viewing function. For example, the media guidance application may store in storage (e.g., storage 608), or remotely at a media guidance data source (e.g., media guidance data source 718) accessible via a communications network (e.g., communications network 714)), a mathematical function (e.g., as described below with respect to FIG. 2) that relates the amount of available storage to a threshold viewing progress. The mathematical function may be continuous, discontinuous, and/or single-valued. As a specific example, the media guidance application may determine (e.g., via control circuitry 604 (FIG. 6)) that only 10% of the storage of the storage device is available and input this into the mathematical function, which may return an output of ⅞. In this example, the media guidance application calculates a high threshold viewing progress since very little storage space is available.

Process 100 continues to 114, where the media guidance application determines (e.g., via control circuitry 604 (FIG. 6)) whether the aggregated viewing progress exceeds the threshold viewing progress. For example, the media guidance application may compare (e.g., via control circuitry 604 (FIG. 6)) values for the aggregated viewing progress and the threshold viewing progress to determine whether the aggregated viewing progress exceeds the threshold (e.g., by subtracting one value from the other and determining whether the result returned is positive, negative, or zero). As a specific example, the media guidance application may determine (e.g., via control circuitry 604 (FIG. 6)) that the aggregated viewing progress is 33% which does not meet the threshold of 50% which was calculated from the amount of storage available on the storage device as described above. As referred to herein, "aggregated viewing progress" should be understood to mean the viewing progress of a user through episodes of the series. In some embodiments, the aggregated viewing progress includes episodes already deleted from storage, but viewed by the user as reflected in a user profile. In another embodiment, the aggregated viewing progress includes the viewing progress of multiple users accessing the episodes on the same user equipment device.

If the media guidance application determines (e.g., via control circuitry 604 (FIG. 6)) the aggregated viewing progress exceeds the threshold viewing progress, process 100 continues to 116, where the media guidance application determines (e.g., via control circuitry 604 (FIG. 6)) to not modify the instruction to store episodes of the series. For example, if the threshold viewing progress calculated using the series viewing function is 80% (i.e., 80% of the series needs to be viewed in order to not adjust the instruction to store episodes of the series) and the user has viewed to completion 9 out of 10 stored episodes (e.g., the aggregated viewing progress is 90%) then the media guidance application may not modify the instruction to store episodes of the series.

If the media guidance application determines (e.g., via control circuitry 604 (FIG. 6)) the aggregated viewing progress does not exceed the threshold viewing progress, process 100 continues to 118, where the media guidance application modifies (e.g., via control circuitry 604 (FIG. 6)) the instruction to store episodes of the series. For example, if the threshold viewing progress calculated using the series viewing function is 80% (i.e., 80% of the series needs to be viewed in order to not adjust the instruction to store episodes of the series) and the user has viewed to completion 4 out of 10 stored episodes (e.g., the aggregated viewing progress is 40%) then the media guidance application may modify the instruction to store episodes of the series.

Figure 2:
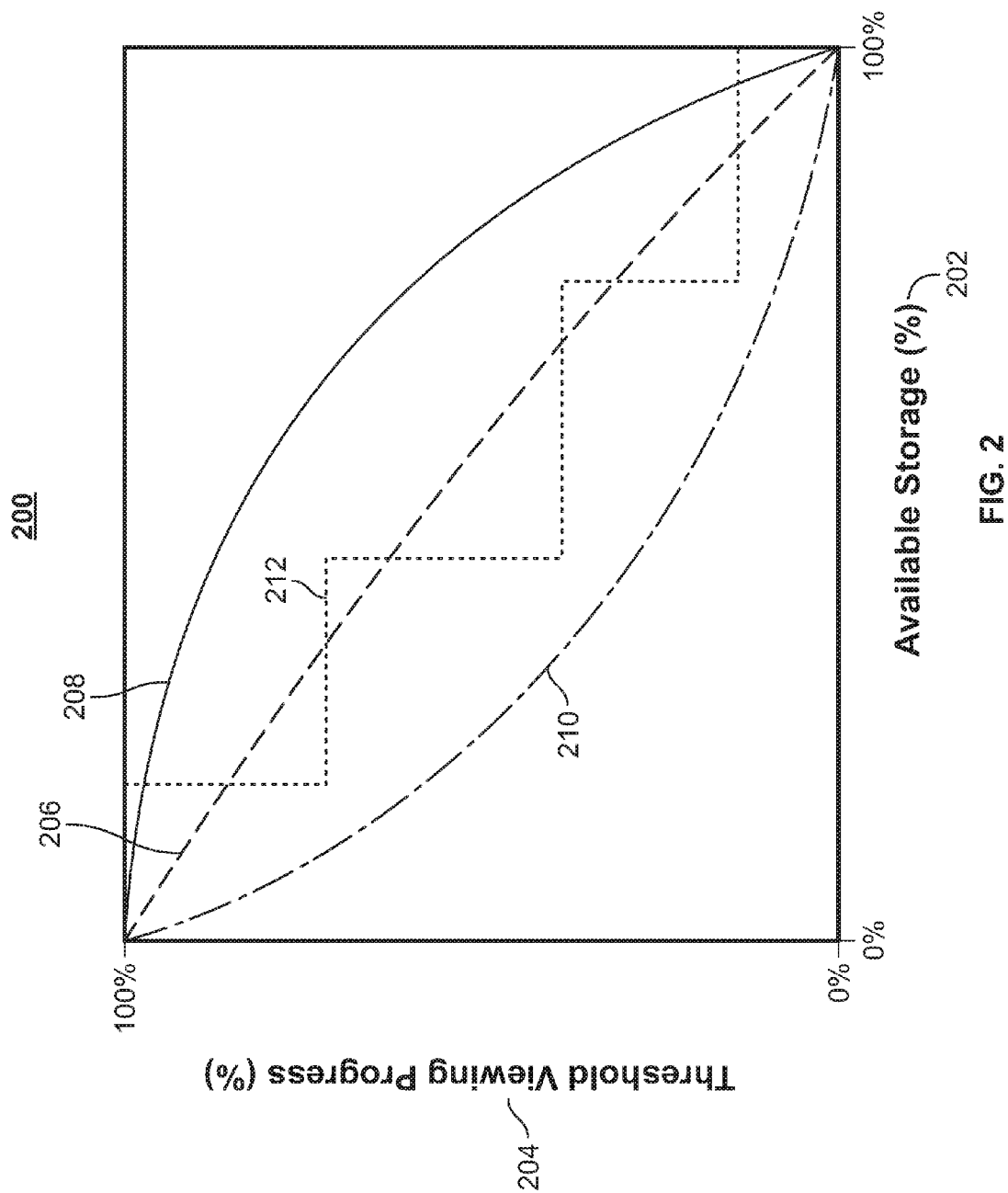
FIG. 2 shows an illustrative example of a series viewing function for mapping available storage to a threshold viewing progress, in accordance with some embodiments of the disclosure.

FIG. 2 shows an illustrative example of a series viewing function for mapping available storage to a threshold viewing progress, in accordance with some embodiments of the disclosure. For example, FIG. 2 shows graphical depictions of mathematical functions (e.g., functions 206, 208, 210, and 212) for computing threshold viewing progress 204 as a function of available storage 202. For example, every value retrieved for the available storage 202 remaining on the storage device has a corresponding threshold viewing progress 204, which is used to determine whether to modify the instruction to store the series as discussed in FIGS. 1 and 8. The axes for threshold viewing progress 204 and available storage 202 may be in any units (e.g., blocks of memory instead of a percentage), but are preferably expressed as percentages or ratios.

FIG. 2 shows function 206, a linear mapping between available storage 202 and threshold viewing progress 204. In function 206, if 67% of the storage is available, the threshold viewing progress may be 33%. The slope of the line may be different such that lower threshold viewing progresses than 100% are the maximum. For example, instead of 100% being the maximum (e.g., the aggregated viewing progress would need to be 100% for the instruction to not be modified), a lower percentage like 80% may be the maximum. In that situation, even if no space is available on the storage device, there is some tolerance in modifying the series viewing instruction.

Function 208 represents an "aggressive modification" mapping between available storage 202 and threshold viewing progress 204. In function 208, if 67% of the storage is available, the threshold viewing progress may be 70%. This mapping may be useful to a user that tends to either quickly watch series fully as soon as episodes are stored or forget about them entirely. Function 210 represents the opposite situation and is instead a "minimal modification" mapping between available storage 202 and threshold viewing progress 204. In function 210, if 67% of the storage is available, the threshold viewing progress may be 15%. This mapping may be useful to users that wait for shows to be stored and then rapidly view (e.g., "binge watch") them later. Using function 208, the instruction to record episodes of the series might be modified before a user that has this viewing habit had decided whether or not to watch the episodes and thus the user might miss episodes they desired to watch as they rapidly view the episodes later. Function 210 represents a step-function mapping between available storage 202 and threshold viewing progress 204. This mapping may be customized to provide similar mappings to any of the functions discussed above, but because it contains discrete levels instead of continuous functions, it may lead to faster, more efficient processing and determination of the threshold viewing progress.

In some embodiments, the media guidance application retrieves a first value of the amount of available storage. As described above, the media guidance application may retrieve the value of blocks of memory free and available to store media assets. The media guidance application then executes a program script, wherein the first value is input to a mathematical function (e.g., one of functions 206, 208, 210, and 212) mapping values for the amount of available storage 202 to threshold viewing progress 204. For example, the media guidance application may execute a program script (e.g., a C++ program) with the amount of memory available as an input to a mathematical function, as described above. The media guidance application receives, as an output of the program script, the threshold viewing progress. For example, the program script may return a threshold viewing progress based on the amount of available storage input and terminate.

In other embodiments, the media guidance application may generate for display options allowing the user to select the mathematical function, or type of mathematical function, to use during the mapping. As discussed above, different users have different viewing habits and may prefer to modify the instruction differently depending on the amount of available storage. For example, a user that prefers to rapidly view episodes of a series after an entire season has been stored may prefer function 210 such that episodes are still stored (e.g., the instruction is not modified) even though few episodes have been viewed yet. The media guidance application may generate for display selectable options describing the functions which a user can select choosing the function used during the calculation of the threshold viewing progress. Alternatively or additionally, the media guidance application may graphically display the functions.

Figure 3:
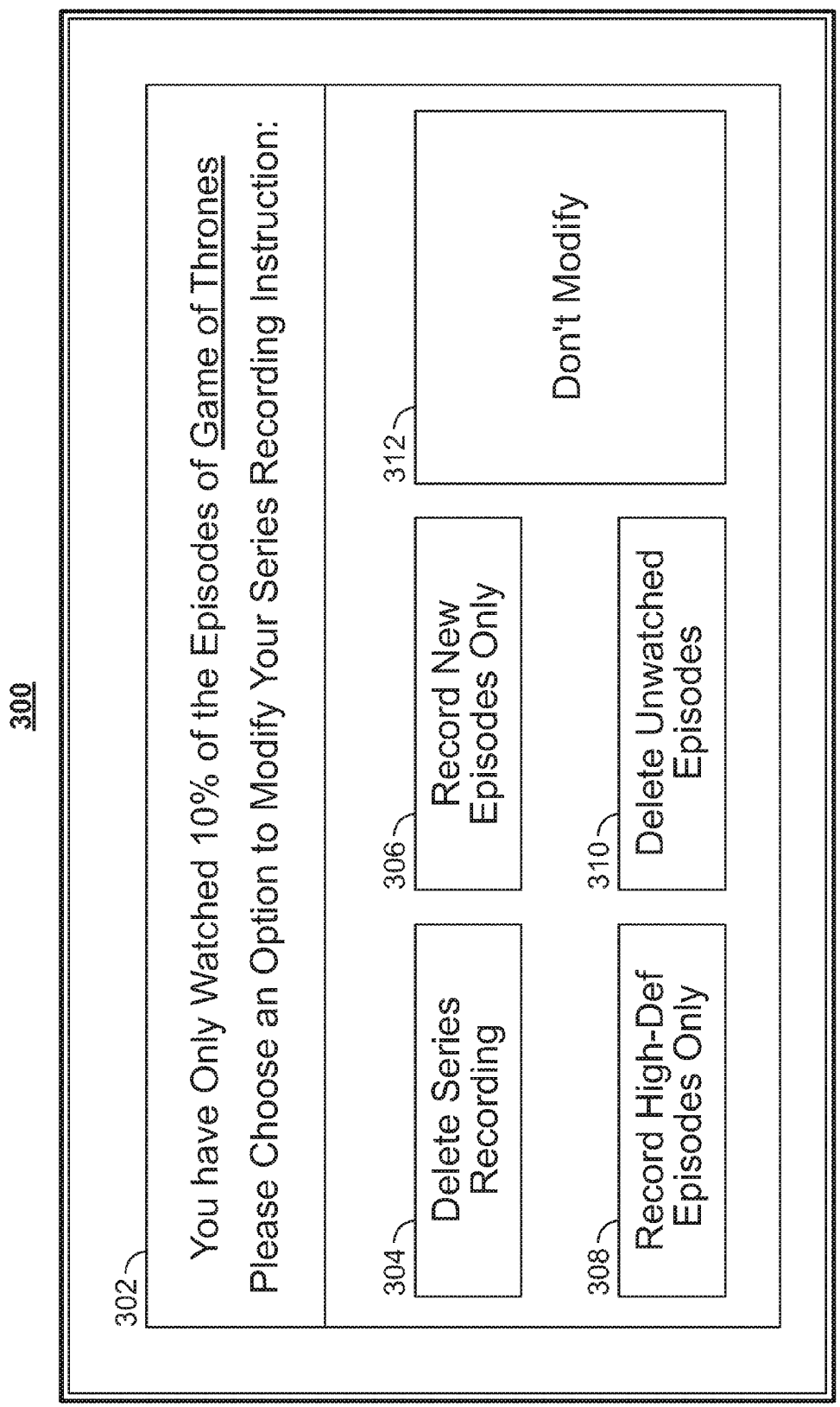
FIG. 3 shows an illustrative example of a display screen presenting options to modify the instruction to store episodes of the series, in accordance with some embodiments of the disclosure.

FIG. 3 shows an illustrative example of a display screen presenting options to modify the instruction to store episodes of the series, in accordance with some embodiments of the disclosure. For example, FIG. 3 shows notification 302 on display 300 with options 304, 306, 308, and 310 to modify the instruction to store the series, as well as option 312 to not modify the instruction to store the series.

FIG. 3 includes notification 302 which notifies the user that the user's viewing progress of a particular series (e.g., "Game of Thrones") that was scheduled to be stored does not exceed the threshold viewing progress. In some embodiments, notification 302 may be displayed if the aggregated viewing progress is above, but still close to the threshold viewing progress (e.g., the aggregated viewing progress is 82% and the threshold viewing progress is 80%). Notification 302 may optionally include images and/or video from the series referred to in notification 302, which may help remind the user of the content of the show and allow them to make a more informed choice on how to modify the instruction.

Notification 302 includes option 304 to delete the instruction to store episodes of the series. For example, based on receiving a user selection (e.g., via a user input interface as described further in FIG. 6) of option 304, the media guidance application may execute a program script which accesses the scheduling database and deletes the instruction to store episodes of the series. Notification 302 also includes option 306 to only store new episodes. For example, based on receiving a user selection (e.g., via a user input interface as described further in FIG. 6) of option 306, the media guidance application may execute a program script which accesses the scheduling database and modifies a new episodes field in the instruction to store episodes of the series. The new episodes field may be a Boolean, where when set to true the media guidance application will only store new episodes, and when set to false the media guidance application will store all episodes.

Notification 302 includes option 308 to store high-definition only. Option 308 could be any other parameter relating to output of the media asset (e.g., aspect ratio) and high-definition is chosen for purely illustrative purposes. For example, based on receiving a user selection (e.g., via a user input interface as described further in FIG. 6) of option 308, the media guidance application may execute a program script which accesses the scheduling database and modifies a requirements field in the instruction to store episodes of the series. The requirements field may be a single character, where each character represents a unique combination of output parameters, such as high-definition. For example, "H" may lead the media guidance application to store only high-definition episodes, while "S" may lead the media guidance application to store only standard-definition episodes.

Notification 302 includes option 310 to delete unwatched episodes. For example, based on receiving a user selection (e.g., via a user input interface as described further in FIG. 6) of option 310, the media guidance application may retrieve viewing progress from the user profile for each of the episodes of the series and delete episodes the user has not viewed. In some embodiments, the media guidance application deletes episodes that the user has viewed below a threshold episode viewing progress of (e.g., 20%). Notification 302 includes option 312 to not modify the instruction. For example, based on receiving a user selection (e.g., via a user input interface as described further in FIG. 6) of option 312, the media guidance application may close notification 302 and not modify the scheduling instruction stored in the scheduling data structure.

In some embodiments, the user can select multiple options to allow for greater flexibility in how the finite amount of storage on the storage device is used. For example, the user may select options to delete episodes they have watched 50% of, as well as to only store new episodes of the series. The media guidance application then modifies the instruction to store episodes of the series based on the received user selections. For example, as described above, the media guidance application may access the scheduling data structure and write (e.g., by executing a program script) a new instruction (e.g., into a field of the row for the existing instruction) based on the received user selection.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
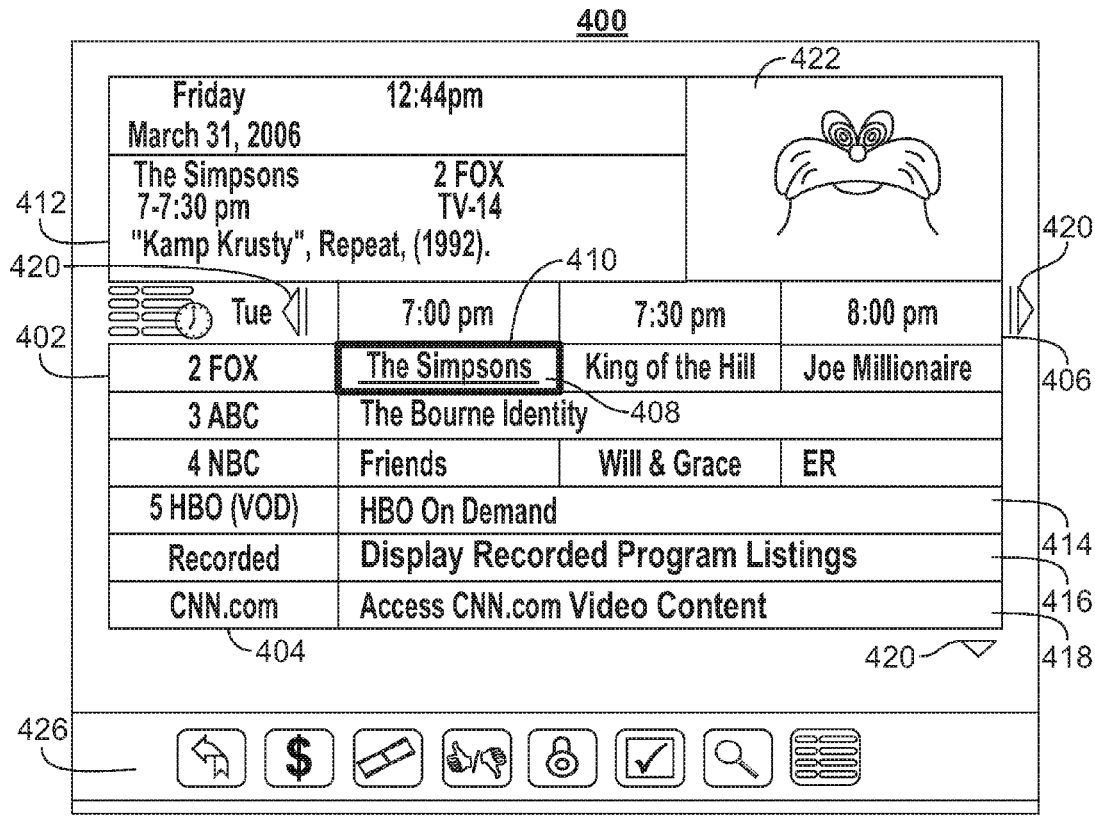
FIG. 4 shows an illustrative example of a display screen for use in accessing media content in accordance with some embodiments of the disclosure.
Figure 5:
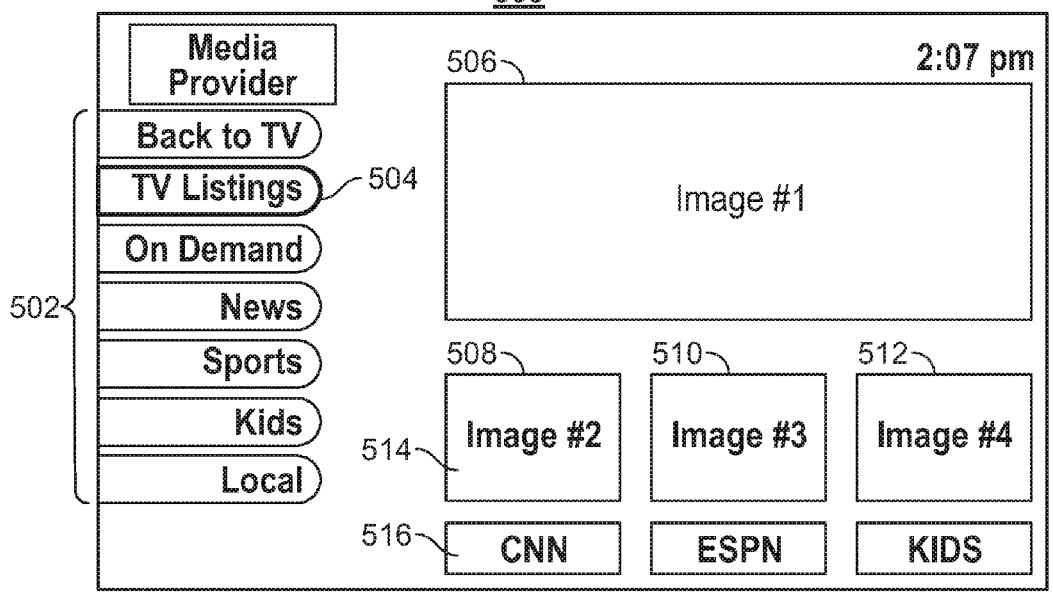
FIG. 5 shows another illustrative example of a display screen for use in accessing media content in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listings associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
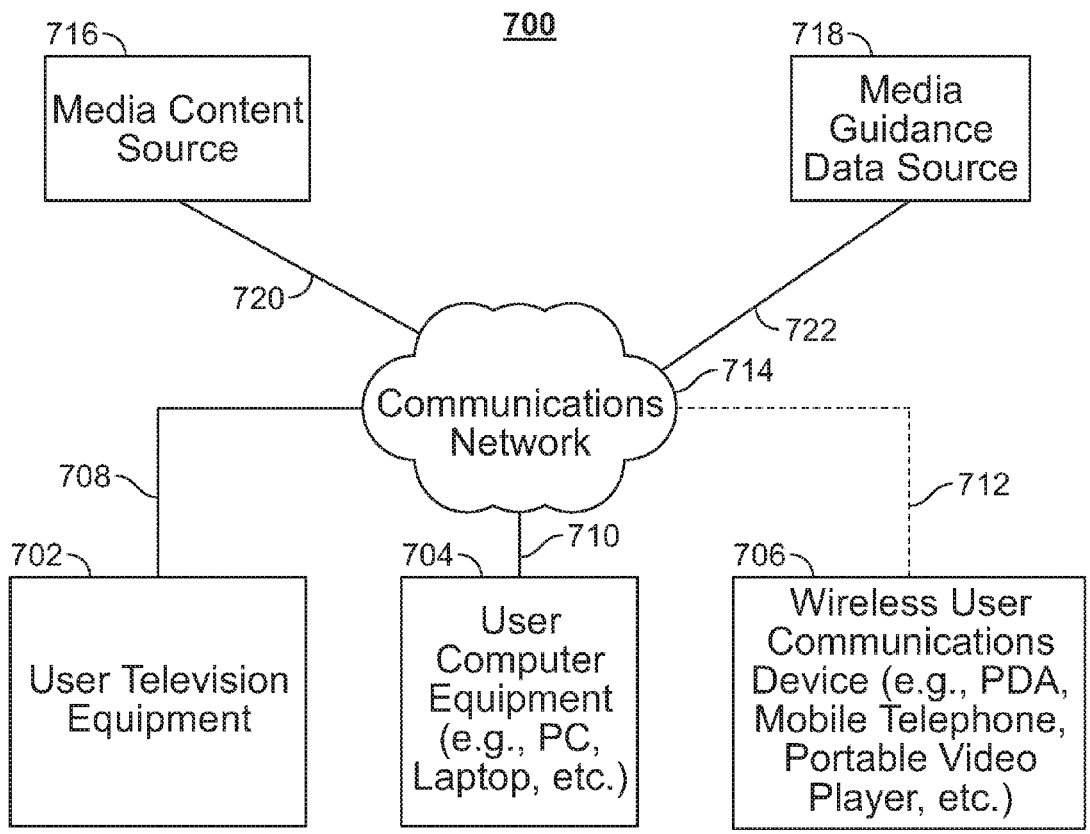
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively.

Communications network 714 may be one or more networks including the Internet, a mobile phone network, mobile voice or data network (e.g., a 4G or LIB network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred to herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 8:
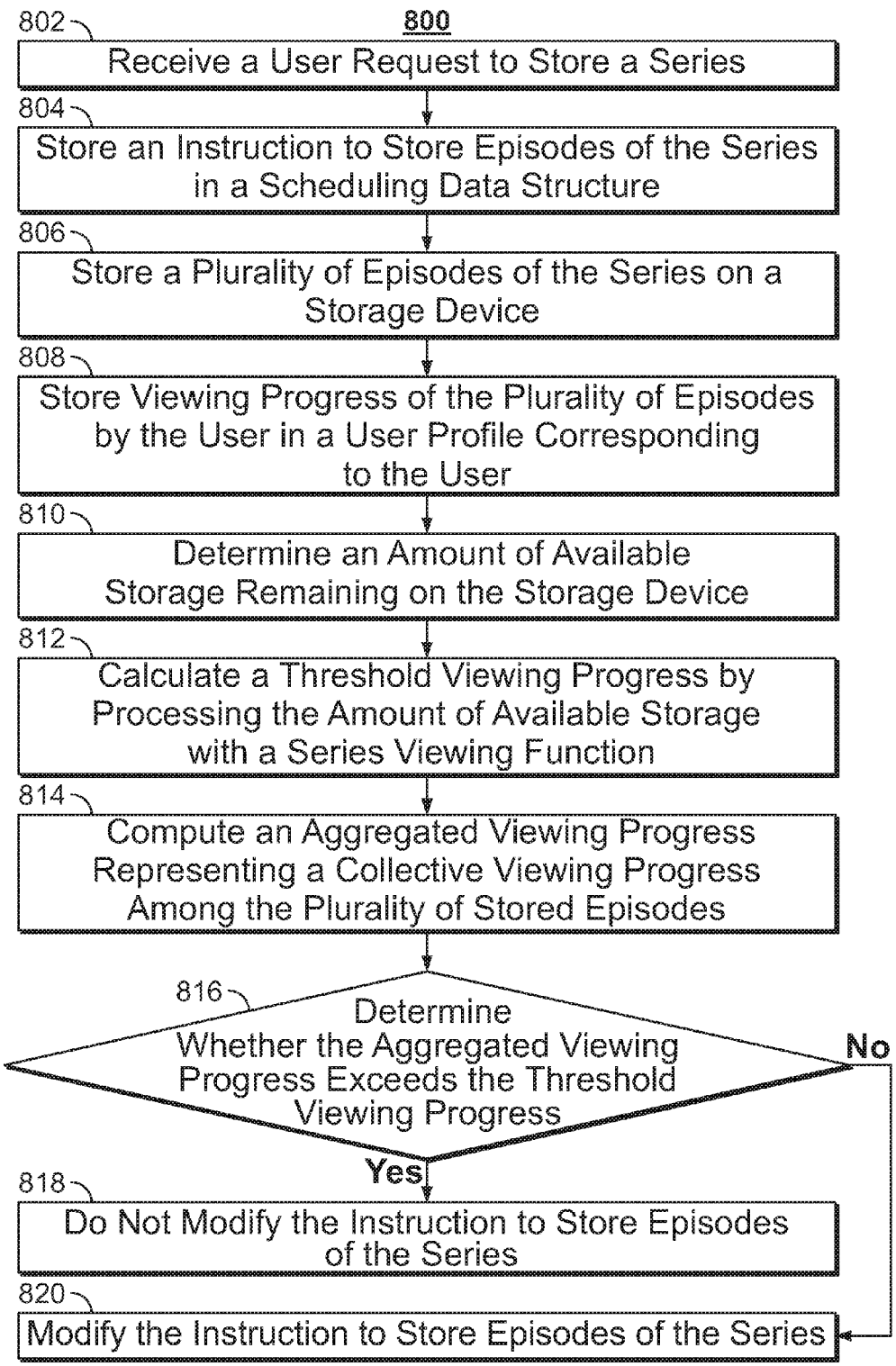
FIG. 8 is another flowchart of illustrative steps for modifying scheduled storage of a series as a function of available storage, in accordance with some embodiments of the disclosure.

FIG. 8 is a flowchart of illustrative steps for modifying scheduled storage of a series as a function of available storage, in accordance with some embodiments of the disclosure. For example, a media guidance application implementing process 800 may be executed by control circuitry 604 (FIG. 6). It should be noted that process 800 or any step thereof could be performed on, or provided by, any of the devices shown in FIGS. 6-7.

Process 800 begins at 802, where the media guidance application receives (e.g., via control circuitry 604 (FIG. 6)) a user request to store a series. For example, as discussed further in FIG. 9 below, the media guidance application (e.g., via control circuitry 604 (FIG. 6)) may receive a user selection of an option to store all new episodes of the program series "Game of Thrones" via a user input interface (e.g., via user input interface 610 (FIG. 6)). The user may select the option to store the series in a program listing screen (e.g., in a grid guide (FIGS. 4-5)), through a series recording option for Game of Thrones, remotely from the set-top box using a mobile device, or any other method for selecting programs to be stored.

Process 800 continues to 804, where the media guidance application stores (e.g., via control circuitry 604 (FIG. 6)) an instruction to store episodes of the series in a scheduling data structure. For example, as discussed above for FIG. 1, the media guidance application may maintain a scheduling data structure stored in storage (e.g., storage 608), or remotely at a media guidance data source (e.g., media guidance data source 718) accessible via a communications network (e.g., communications network 714)). The scheduling data structure may be organized as a table, where each instruction is stored in a different row and parameters associated with the instruction (e.g., start time to record, end time, and/or source) are stored in fields in the row. As a specific example, the media guidance application may execute (e.g., via control circuitry 604 (FIG. 6)) a program script to write a new entry in the scheduling data structure in response to the user selecting to store the series "Game of Thrones." The new entry may include separate fields with parameters associated with the instruction to store episodes of "Game of Thrones," such as: "type=series," "source=HBO," "start time=9 pm," and/or "end time=10 pm."

Process 800 continues to 806, where the media guidance application stores (e.g., via control circuitry 604 (FIG. 6)) a plurality of episodes of the series on a storage device. For example, as discussed above for FIG. 1, the media guidance application may execute (e.g., via control circuitry 604 (FIG. 6)) a program script which compares the clock time with start times stored in the scheduling database for various scheduling events. When the clock time corresponds to the start time of a scheduling event, the media guidance application may take the appropriate action (e.g., receive data from a particular source as defined in the scheduling data structure and store the data).

Process 800 continues to 808, where the media guidance application stores (e.g., via control circuitry 604 (FIG. 6)) viewing progress of the plurality of episodes by the user in a user profile corresponding to the user. For example, as described further below in FIG. 10, the media guidance application may maintain a user profile in a data structure, which may be stored in storage (e.g., storage 608), or remotely at a media guidance data source (e.g., media guidance data source 718) accessible via a communications network (e.g., communications network 714)). The user profile may be per user (e.g., a user is identified by the media guidance application based on login credentials and separate viewing progress for each user is maintained) or per device (e.g., even if a device has multiple users that view a media asset, only a single viewing progress is stored by the media guidance application). The data structure that stores the user profile may be organized similarly to the scheduling data structure described above. For example, the media guidance application may organize (e.g., via control circuitry 604 (FIG. 6)) the user profile as a table, where each media asset the user has consumed is stored in a different row and parameters associated with the media asset (e.g., the user's viewing progress and/or what time and date the media asset was last accessed) are stored in fields in the row. Each time the user accesses a particular media asset, the media guidance application may query (e.g., via control circuitry 604 (FIG. 6)) the user profile to determine whether the media asset has been accessed previously by the user and update the viewing progress for the entry corresponding to the media asset. If the user has not previously viewed the media asset, the media guidance application may generate (e.g., via control circuitry 604 (FIG. 6)) a new entry in the user profile.

Process 800 continues to 810, where the media guidance application determines (e.g., via control circuitry 604 (FIG. 6)) an amount of available storage remaining on the storage device. For example, the media guidance application may determine (e.g., via control circuitry 604 (FIG. 6)) how many blocks of memory are free (e.g., currently unused to store data) and thus available to store media assets. The media guidance application may process (e.g., via control circuitry 604 (FIG. 6)) the amount of available storage such that it can be input into the series viewing function, as described below. For example, the media guidance application may divide the total free blocks of memory by the total blocks of memory to determine a percentage of space available to store new media assets (e.g., 5% available).

Process 800 continues to 812, where the media guidance application calculates (e.g., via control circuitry 604 (FIG. 6)) a threshold viewing progress by processing the amount of available storage with a series viewing function. For example, as described further below in FIG. 11, the media guidance application may store in storage (e.g., storage 608), or remotely at a media guidance data source (e.g., media guidance data source 718) accessible via a communications network (e.g., communications network 714)), a mathematical function (e.g., as described above with respect to FIG. 2) that relates the amount of available storage to a threshold viewing progress. The mathematical function may be continuous, discontinuous, and/or single-valued. As a specific example, the media guidance application may determine (e.g., via control circuitry 604 (FIG. 6)) that only 10% of the storage of the storage device is available and input this into the mathematical function, which may return an output of 87.5%. In this example, the media guidance application calculates a high threshold viewing progress since very little storage space is available.

Process 800 continues to 814, where the media guidance application computes (e.g., via control circuitry 604 (FIG. 6)) an aggregated viewing progress representing a collective viewing progress among the plurality of stored episodes. For example, as described further below in FIG. 12, the media guidance application may execute (e.g., via control circuitry 604 (FIG. 6)) a database query language script, such as an SQL script, to retrieve the viewing progress for specific media assets the user has viewed (e.g., entries in a table in the user profile). The media guidance application may then sum (e.g., via control circuitry 604 (FIG. 6)) the viewing progress for each episode to determine an aggregated viewing progress by the user for the series.

Process 800 continues to 816, where the media guidance application determines (e.g., via control circuitry 604 (FIG. 6)) whether the aggregated viewing progress exceeds the threshold viewing progress. For example, the media guidance application may compare (e.g., via control circuitry 604 (FIG. 6)) values for the aggregated viewing progress and the threshold viewing progress to determine whether the aggregated viewing progress exceeds the threshold (e.g., by subtracting one value from the other and determining whether the result returned is positive, negative, or zero). As a specific example, the media guidance application may determine (e.g., via control circuitry 604 (FIG. 6)) that the aggregated viewing progress is 33% which does not meet the threshold of 50% which was calculated from the amount of storage available on the storage device as described above.

If the media guidance application determines (e.g., via control circuitry 604 (FIG. 6)) the aggregated viewing progress exceeds the threshold viewing progress, process 800 continues to 818, where the media guidance application determines (e.g., via control circuitry 604 (FIG. 6)) to not modify the instruction to store episodes of the series. For example, if the threshold viewing progress calculated using the series viewing function is 80% (i.e., 80% of the series needs to be viewed in order to not adjust the instruction to store episodes of the series) and the user has viewed to completion 9 out of 10 stored episodes (e.g., the aggregated viewing progress is 90%) then the media guidance application may not modify the instruction to store episodes of the series.

If the media guidance application determines (e.g., via control circuitry 604 (FIG. 6)) the aggregated viewing progress does not exceed the threshold viewing progress, process 800 continues to 820, where the media guidance application modifies (e.g., via control circuitry 604 (FIG. 6)) the instruction to store episodes of the series. For example, if the threshold viewing progress calculated using the series viewing function is 80% (i.e., 80% of the series needs to be viewed in order to not adjust the instruction to store episodes of the series) and the user has viewed to completion 4 out of 10 stored episodes (e.g., the aggregated viewing progress is 40%) then the media guidance application may modify the instruction to store episodes of the series, as described further in FIG. 13.

Figure 9:
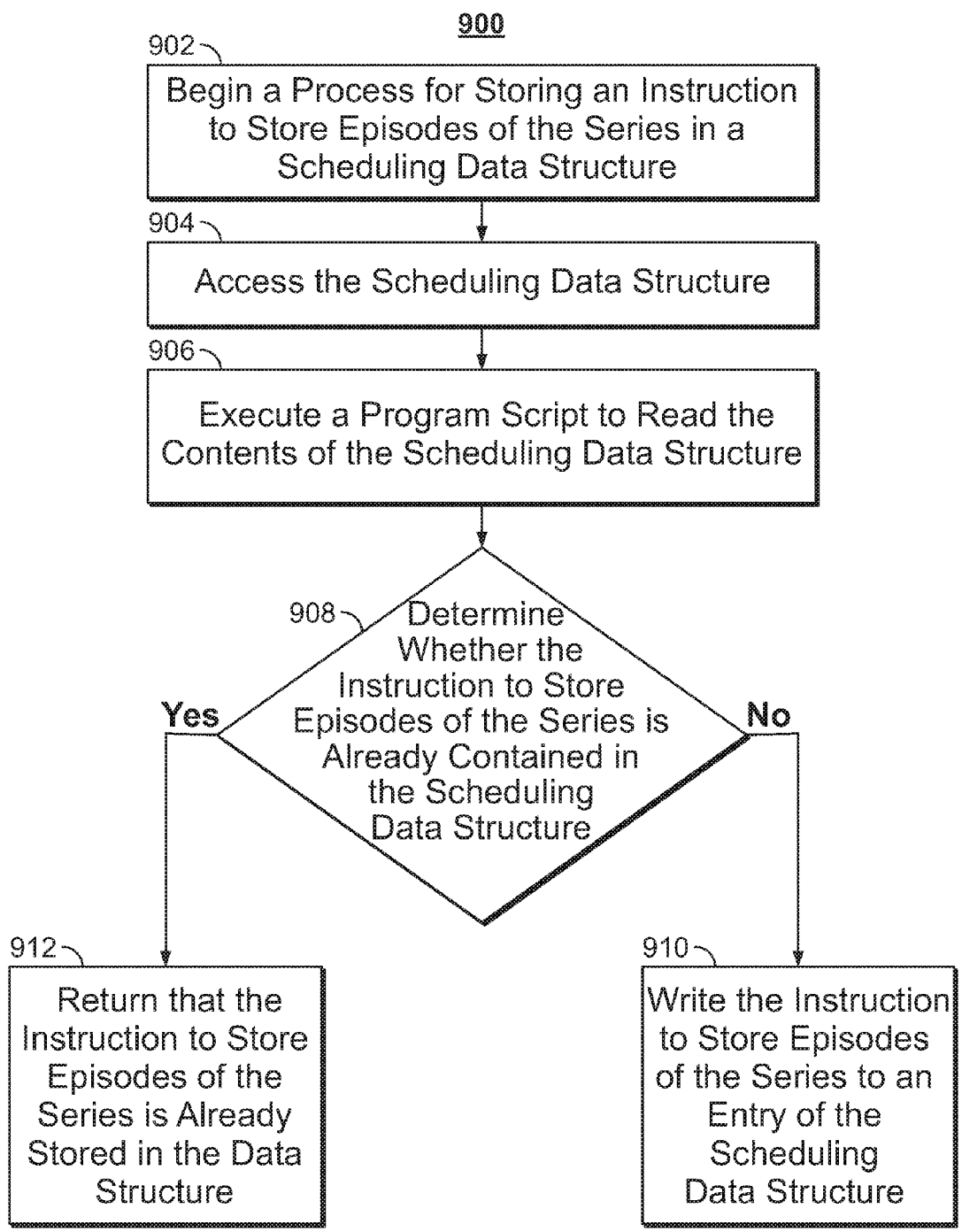
FIG. 9 is a flowchart of illustrative steps for storing an instruction to store episodes of the series, in accordance with some embodiments of the disclosure.

FIG. 9 is a flowchart of illustrative steps for storing an instruction to store episodes of the series, in accordance with some embodiments of the disclosure. For example, a media guidance application implementing process 900 may be executed by control circuitry 604 (FIG. 6). It should be noted that process 900 or any step thereof could be performed on, or provided by, any of the devices shown in FIGS. 6-7. Process 900 starts at 902, where the media guidance application begins (e.g., via control circuitry 604 (FIG. 6)) a process for storing an instruction to store episodes of the series in a scheduling data structure. For example, the media guidance application may initialize the necessary variables and execute (e.g., via control circuitry 604 (FIG. 6)) a program script calling a particular method to execute process 900.

Process 900 continues to 904, where the media guidance application accesses (e.g., via control circuitry 604 (FIG. 6)) the scheduling data structure. For example, the media guidance application may access (e.g., via control circuitry 604 (FIG. 6)) the scheduling data structure in memory (e.g., stored locally in memory (e.g., storage 508), or remotely at a media guidance data source (e.g., media guidance data source 718) accessible via a communications network (e.g., communications network 714)).

Process 900 continues to 906, where the media guidance application executes (e.g., via control circuitry 604 (FIG. 6)) a program script to read the contents of the scheduling data structure. For example, the media guidance application may execute (e.g., via control circuitry 604 (FIG. 6)) a program script which iterates through successive entries of the scheduling data structure (e.g., rows that each contain scheduling instructions) and retrieves the contents of the instruction from each entry (e.g., a unique identifier or title of the media asset series).

Process 900 continues to 908, where the media guidance application determines (e.g., via control circuitry 604 (FIG. 6)) whether the instruction to store episodes of the series is already contained in the scheduling data structure. For example, the media guidance application may compare (e.g., via control circuitry 604 (FIG. 6)) the contents of an entry retrieved from the scheduling data structure (e.g., an identifier of the media asset scheduled to be stored in that particular entry) with an identifier of the series from the user request.

If the instruction to store episodes of the series is not contained in the data structure, process 900 continues to 910, where the media guidance application writes (e.g., via control circuitry 604 (FIG. 6)) the instruction to store episodes of the series to an entry of the scheduling data structure. For example, as described above in FIGS. 1 and 8, the media guidance application may execute (e.g., via control circuitry 604 (FIG. 6)) a program script to write a new entry in the scheduling data structure in response to the user selecting to store the series "Game of Thrones." The new entry may include separate fields with parameters associated with the instruction to store episodes of "Game of Thrones," such as: "type=series," "source=HBO," "start time=9 pm," and/or "end time=10 pm."

If the instruction to store episodes of the series is already contained in the data structure, process 900 continues to 912, where the media guidance application returns (e.g., via control circuitry 604 (FIG. 6)) that the instruction to store episodes of the series is already stored in the scheduling data structure. For example, if the media guidance application determines (e.g., via control circuitry 604 (FIG. 6)) that an instruction to store the series "Game of Thrones" is already stored in the scheduling data structure, a new instruction may not be needed. In some embodiments, the media guidance application may determine (e.g., via control circuitry 604 (FIG. 6)) a single episode of "Game of Thrones" is scheduled and may convert (e.g., via control circuitry 604 (FIG. 6)) the instruction to a series instruction (e.g., by changing the flag for "type=episode" to "type=series").

Figure 10:
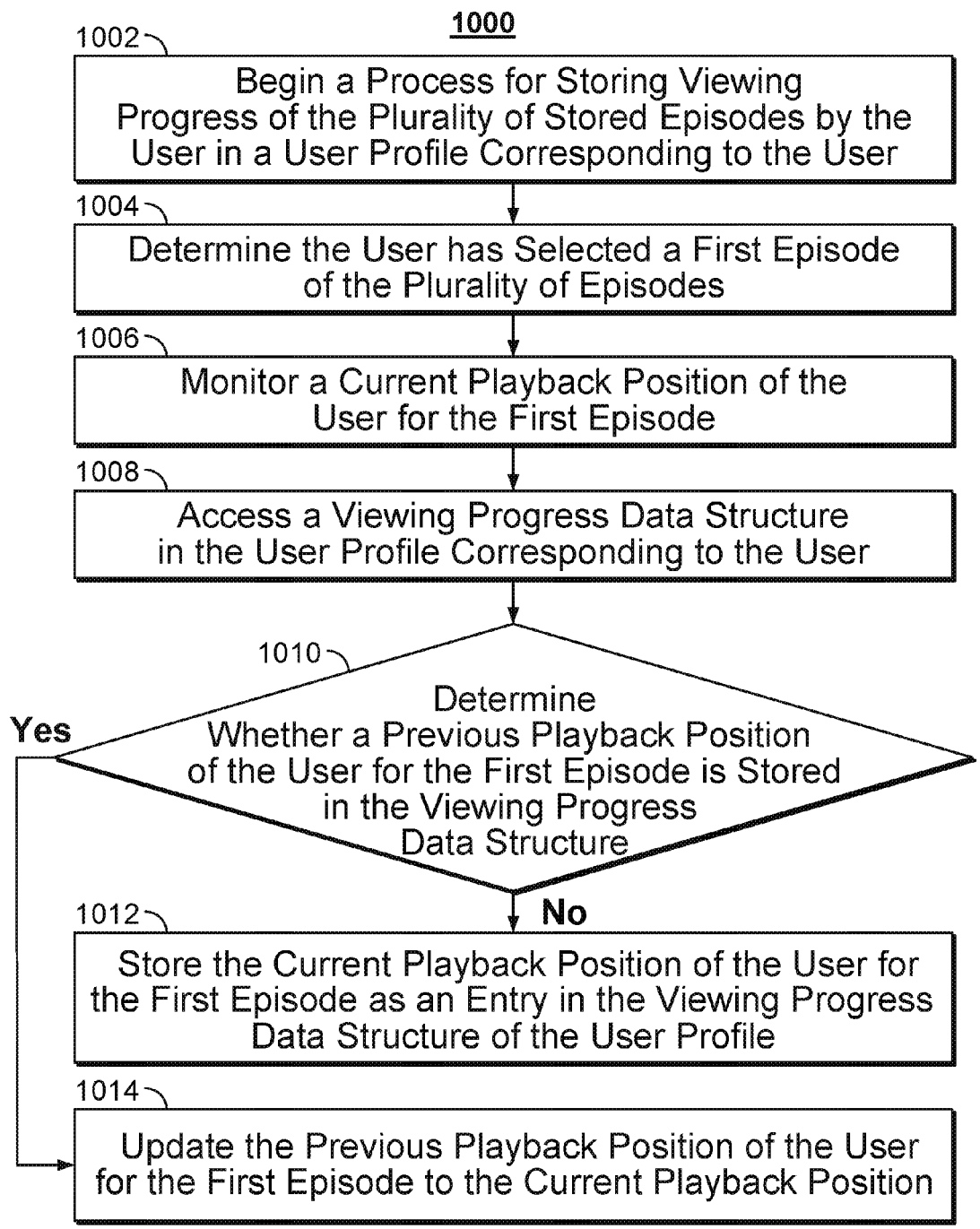
FIG. 10 is a flowchart of illustrative steps for storing viewing progress of the plurality of stored episodes by the user, in accordance with some embodiments of the disclosure.

FIG. 10 is a flowchart of illustrative steps for storing viewing progress of the plurality of stored episodes by the user, in accordance with some embodiments of the disclosure. For example, a media guidance application implementing process 1000 may be executed by control circuitry 604 (FIG. 6). It should be noted that process 1000 or any step thereof could be performed on, or provided by, any of the devices shown in FIGS. 6-7. Process 1000 starts at 1002, where the media guidance application begins (e.g., via control circuitry 604 (FIG. 6)) a process for storing viewing progress of the plurality of stored episodes by the user in a user profile corresponding to the user. For example, the media guidance application may initialize the necessary variables and execute (e.g., via control circuitry 604 (FIG. 6)) a program script calling a particular method to execute process 1000.

Process 1000 continues to 1004, where the media guidance application determines (e.g., via control circuitry 604 (FIG. 6)) the user has selected a first episodes of the plurality of episodes. For example, the media guidance application may determine (e.g., via control circuitry 604 (FIG. 6)) that the user has selected a first episode, "The Winds of Winter" of the series, "Game of Thrones," based on metadata associated with "The Winds of Winter," (e.g., received from a media guidance data source).

Process 1000 continues to 1006, where the media guidance application monitors (e.g., via control circuitry 604 (FIG. 6)) a current playback position of the user for the first episode. For example, the media guidance application may monitor (e.g., via control circuitry 604 (FIG. 6)) the viewing progress of the user viewing "The Winds of Winter" and determine that the user has viewed 15 minutes of the episode. In some embodiments, the media guidance application may monitor the viewing progress by retrieving a time code from data packets received with the media asset "The Winds of Winter" identifying the current time and frame of playback in the media asset.

Process 1000 continues to 1008, where the media guidance application accesses (e.g., via control circuitry 604 (FIG. 6)) a viewing progress data structure in a user profile corresponding to the user. For example, the media guidance application may access (e.g., via control circuitry 604 (FIG. 6)) the viewing progress data structure (e.g., stored locally in memory (e.g., storage 508), or remotely at a media guidance data source (e.g., media guidance data source 718) accessible via a communications network (e.g., communications network 714)). In some embodiments, the media guidance application transmits an authentication key, which may be generated or received in response to input from a user (e.g., via user input interface 610), to access the user profile.

Process 1000 continues to 1010, where the media guidance application determines (e.g., via control circuitry 604 (FIG. 6)) whether a previous playback position of the user for the first episode is stored in the viewing progress data structure. For example, the media guidance application may determine (e.g., via control circuitry 604 (FIG. 6)) whether an entry exists in the viewing progress data structure for the first episode containing a previous playback position based on an identifier of the first episode in a similar manner to that described above in FIG. 9 for determining whether an instruction to store a series is already contained in the scheduling data structure.

If the media guidance application determines that a previous playback position of the user for the first episode is not stored, process 1000 continues to 1012, where the media guidance application stores (e.g., via control circuitry 604 (FIG. 6)) the current playback position of the user for the first episode as an entry in a viewing progress data structure of the user profile. For example, the media guidance application may execute (e.g., via control circuitry 604 (FIG. 6)) a program script to write a new entry in the viewing progress data structure in response to determining that there is not an entry for the first episode. The new entry (e.g., a row in a table) may include separate fields with parameters such as the title of the episode and the playback progress stored as integers in separate variables for hours, minutes, seconds, frames.

If the media guidance application determines that a previous playback position of the user for the first episode is already stored, process 1000 continues to 1012, where the media guidance application updates (e.g., via control circuitry 604 (FIG. 6)) the previous playback position of the user for the first episode to the current playback position. For example, the media guidance application may execute (e.g., via control circuitry 604 (FIG. 6)) a program script to write the current playback position to the field of the entry for the first episode in the viewing progress data structure containing the previous playback position.

In order to store the current playback position of the user for the first episode as an entry in a viewing progress data structure of the user profile, the media guidance application may calculate (e.g., via control circuitry 604 (FIG. 6)) a fraction of the first episode viewed by the user based on a duration of the first episode and the current playback position of the user. For example, the media guidance application may retrieve (e.g., via control circuitry 604 (FIG. 6)) the current playback progress (e.g., 15 minutes) for the episode, "The Winds of Winter" of the series, "Game of Thrones" by the user, as discussed above from the user profile. The media guidance application may then calculate (e.g., via control circuitry 604 (FIG. 6)) the fraction of "The Winds of Winter" viewed by the user as ¼ based on retrieving the total duration of the episode as 60 minutes (e.g., from media guidance data source 718). The media guidance application then retrieves a threshold fractional viewing progress stored in memory. For example, the media guidance application may retrieve (e.g., via control circuitry 604 (FIG. 6)) the value of the threshold fractional viewing progress as ½ from a field in the user profile. The value for the threshold fractional viewing progress may be user or device specific.

The media guidance application compares (e.g., via control circuitry 604 (FIG. 6)) the fraction of the first episode viewed by the user to the threshold fractional viewing progress. For example, the media guidance application may compare (e.g., via control circuitry 604 (FIG. 6)) the values of the threshold fractional viewing progress (e.g., ½) to the fraction of the first episode viewed by the user (e.g., ¼) to determine which is greater. The media guidance application, in response to determining the fraction of the first episode viewed by the user meets the fractional viewing progress, stores (e.g., via control circuitry 604 (FIG. 6)) with the entry an indication that the first episode has been completely viewed by the user. For example, upon determining that the user has viewed more than the threshold, the media guidance application may set (e.g., via control circuitry 604 (FIG. 6)) a Boolean value corresponding to whether the user has viewed the episode to "true." Alternatively or additionally, the media guidance application may allow the user to customize (e.g., via user input interface 610) the threshold fractional viewing progress to what they consider to be an episode that they have viewed, as some users may only want to watch portions of one or more episodes, but are still interested in the series.

Figure 11:
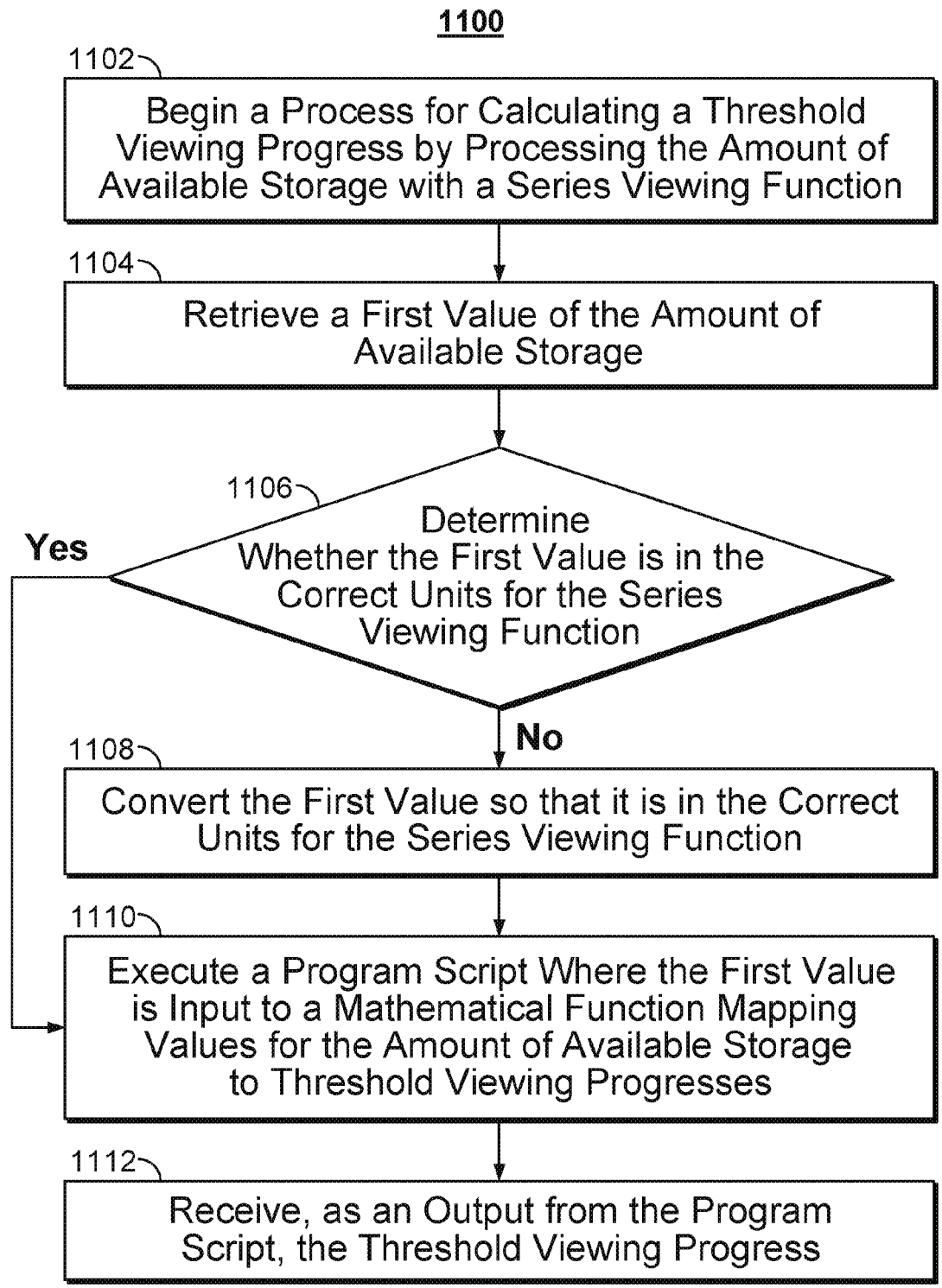
FIG. 11 is a flowchart of illustrative steps for calculating a threshold viewing progress by processing the amount of available storage with a series viewing function, in accordance with some embodiments of the disclosure.

FIG. 11 is a flowchart of illustrative steps for calculating a threshold viewing progress by processing the amount of available storage with a series viewing function, in accordance with some embodiments of the disclosure. For example, a media guidance application implementing process 1100 may be executed by control circuitry 604 (FIG. 6). It should be noted that process 1100 or any step thereof could be performed on, or provided by, any of the devices shown in FIGS. 6-7. Process 1100 starts at 1102, where the media guidance application begins (e.g., via control circuitry 604 (FIG. 6)) a process for calculating a threshold viewing progress by processing the amount of available storage with a series viewing function. For example, the media guidance application may initialize the necessary variables and execute (e.g., via control circuitry 604 (FIG. 6)) a program script calling a particular method to execute process 1100.

Process 1100 continues to 1104, where the media guidance application retrieves (e.g., via control circuitry 604 (FIG. 6)) a first value of the amount of available storage. For example, the media guidance application retrieves (e.g., via control circuitry 604 (FIG. 6)) a value stored in memory (e.g., storage 608) for the determined amount of available storage remaining on the storage device, as described further in FIGS. 1 and 8.

Process 1100 continues to 1106, where the media guidance application determines (e.g., via control circuitry 604 (FIG. 6)) whether the first value is in the correct units for the series viewing function. For example, the media guidance application may determine (e.g., via control circuitry 604 (FIG. 6)) whether the retrieved first value is in the correct units by comparing the first value to boundary conditions for the series viewing function. As a specific example, if the series viewing function requires the function to be a percentage (e.g., the boundary conditions are 0 to 1), the total number of free blocks of memory (e.g., 100,000) would be outside the boundary conditions so the media guidance application would determine (e.g., via control circuitry 604 (FIG. 6)) in this example that the value needs to be converted. In some embodiments, an identifier of the units is stored with the first value in a "units" variable, which allows the media guidance application to quickly determine (e.g., via control circuitry 604 (FIG. 6)) whether conversion is needed.

If the first value is in not in the correct units, process 1100 continues to 1108, where the media guidance application converts (e.g., via control circuitry 604 (FIG. 6)) the first value so that it is in the correct units for the series viewing function. For example, as discussed above in FIGS. 1 and 8, the media guidance application may determine (e.g., via control circuitry 604 (FIG. 6)) the units of the first value and take appropriate action to convert the units to the target units needed for the series viewing function. As a specific example, the media guidance application may divide (e.g., via control circuitry 604 (FIG. 6)) the number of free blocks of memory by the number of total blocks of memory to obtain the percentage that is available to store media assets. After converting the first value to the correct units, process 1100 continues to 1110.

If the first value is in the correct units, process 1100 continues to 1110, where the media guidance application executes (e.g., via control circuitry 604 (FIG. 6)) a program script where the first value is input to a mathematical function mapping values for the amount of available storage to threshold viewing progresses. For example, the media guidance application may store in storage (e.g., storage 608), or remotely at a media guidance data source (e.g., media guidance data source 718) accessible via a communications network (e.g., communications network 714)), a mathematical function (e.g., as described below with respect to FIG. 2) that relates the amount of available storage to a threshold viewing progress. The mathematical function may be continuous, discontinuous, and/or single-valued. As a specific example, the media guidance application may determine (e.g., via control circuitry 604 (FIG. 6)) that only 10% of the storage of the storage device is available and input this into the mathematical function, which may return an output of ⅞. In this example, the media guidance application calculates a high threshold viewing progress since very little storage space is available.

Process 1100 continues to 1112, where the media guidance application receives (e.g., via control circuitry 604 (FIG. 6)), as an output from the program script, the threshold viewing progress. For example, as discussed above, the media guidance application may receive a value for the threshold viewing progress (e.g., 80%) as an output of the program script.

Figure 12:
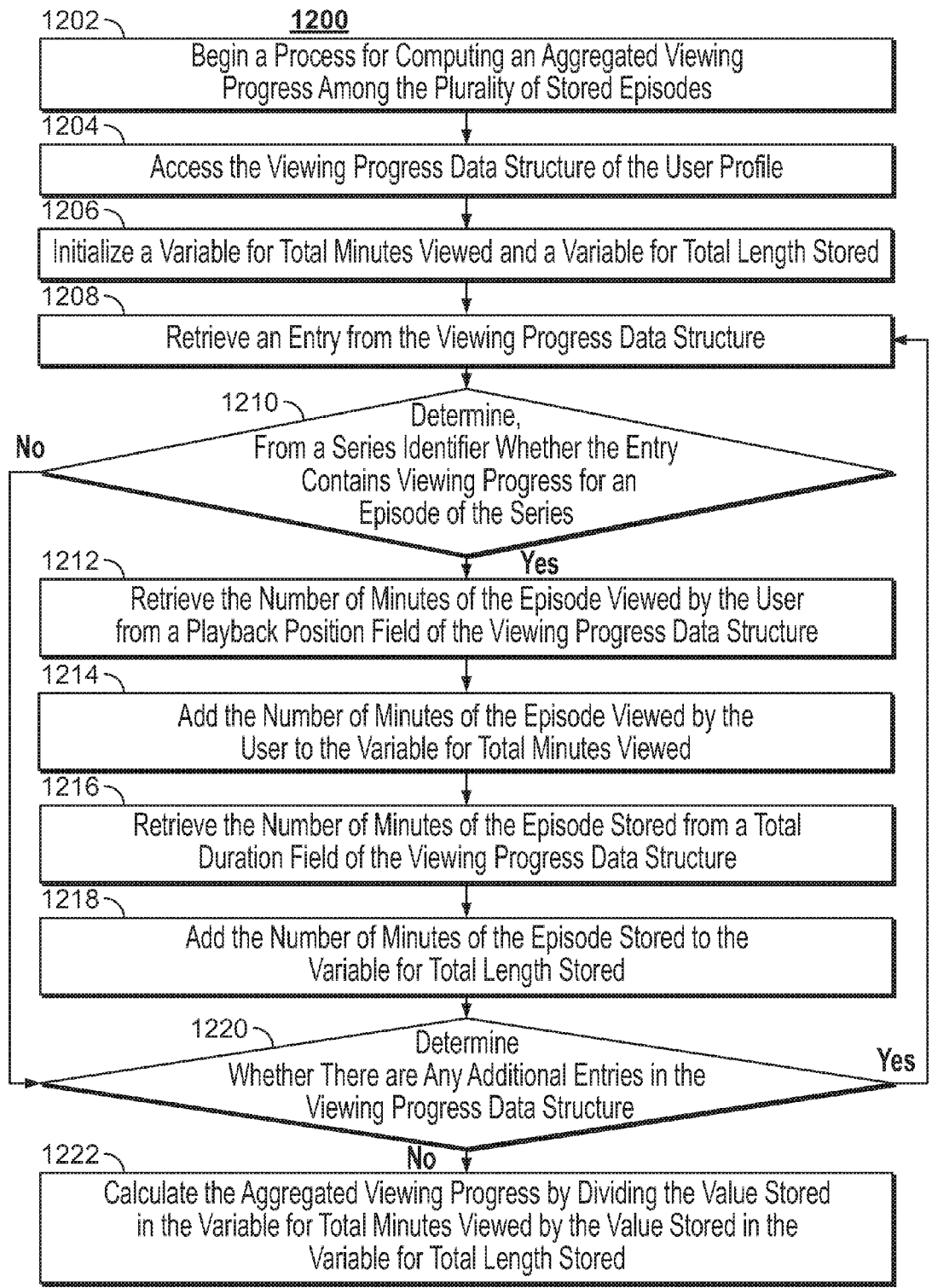
FIG. 12 is a flowchart of illustrative steps for computing an aggregated viewing progress among the plurality of stored episodes, in accordance with some embodiments of the disclosure.

FIG. 12 is a flowchart of illustrative steps for computing an aggregated viewing progress among the plurality of stored episodes, in accordance with some embodiments of the disclosure. For example, a media guidance application implementing process 1200 may be executed by control circuitry 604 (FIG. 6). It should be noted that process 1200 or any step thereof could be performed on, or provided by, any of the devices shown in FIGS. 6-7. Process 1200 starts at 1202, where the media guidance application begins (e.g., via control circuitry 604 (FIG. 6)) a process for computing an aggregated viewing progress among the plurality of stored episodes. For example, the media guidance application may initialize the necessary variables and execute (e.g., via control circuitry 604 (FIG. 6)) a program script calling a particular method to execute process 1200.

Process 1200 continues to 1204, where the media guidance application accesses (e.g., via control circuitry 604 (FIG. 6)) the viewing progress data structure of the user profile. For example, as described in FIG. 10, the media guidance application may access (e.g., via control circuitry 604 (FIG. 6)) the viewing progress data structure (e.g., stored locally in memory (e.g., storage 508), or remotely at a media guidance data source (e.g., media guidance data source 718) accessible via a communications network (e.g., communications network 714)). In some embodiments, the media guidance application transmits an authentication key, which may be generated or received in response to input from a user (e.g., via user input interface 610), to access the user profile.

Process 1200 continues to 1206, where the media guidance application initializes (e.g., via control circuitry 604 (FIG. 6)) a variable for total minutes viewed and a variable for total length stored. For example, the media guidance application may generate (e.g., via control circuitry 604 (FIG. 6)) an integer variable for each of the total minutes viewed and the total length stored and set the initial values to zero minutes. The media guidance application may then update (e.g., via control circuitry 604 (FIG. 6)) the variables based on data retrieved from the viewing progress data structure, as described below.

Process 1200 continues to 1208, where the media guidance application retrieves (e.g., via control circuitry 604 (FIG. 6)) an entry from the viewing progress data structure. For example, the media guidance application may execute (e.g., via control circuitry 604 (FIG. 6)) a program script which iterates through successive entries of the viewing progress data structure (e.g., rows that each contain playback progress for different media assets consumed by the user) and retrieves the contents of each entry (e.g., a unique identifier or title of the media asset series).

Process 1200 continues to 1210, where the media guidance application determines (e.g., via control circuitry 604 (FIG. 6)), from a series identifier, whether the entry contains viewing progress for an episode of the series. For example, the media guidance application may compare (e.g., via control circuitry 604 (FIG. 6)) the contents of an entry retrieved from the scheduling data structure (e.g., an identifier of the media asset scheduled to be stored in that particular entry) with an identifier of the series being queried to determine whether the entry relates to the series being queried.

If the entry does not contain viewing progress for an episode of the series, process 1200 continues to 1220, where the media guidance application determines (e.g., via control circuitry 604 (FIG. 6)) whether there are any additional entries in the viewing progress data structure, as described further below. If the entry does contain viewing progress for an episode of the series, process 1200 continues to 1212, where the media guidance application retrieves (e.g., via control circuitry 604 (FIG. 6)) the number of minutes of the episode viewed by the user from a playback position field of the viewing progress data structure. For example, the media guidance application may extract (e.g., via control circuitry 604 (FIG. 6)) from a field containing the playback progress of the user an integer value for the minutes of the episode viewed by the user. In some embodiments, the playback progress may be stored as a time code (e.g., hours: minutes: seconds: frames), which the media guidance application may convert (e.g., via control circuitry 604 (FIG. 6)) to a single integer and round to the nearest minute.

Process 1200 continues to 1214, where the media guidance application adds (e.g., via control circuitry 604 (FIG. 6)) the number of minutes of the episode viewed by the user to the variable for total minutes viewed. For example, the media guidance application adds (e.g., via control circuitry 604 (FIG. 6)) the number of minutes of the episode viewed by the user as reflected by the playback progress to the stored total minutes viewed and stores the new value (e.g., in storage 608).

Process 1200 continues to 1216, where the media guidance application retrieves (e.g., via control circuitry 604 (FIG. 6)) the number of minutes of the episode stored from a total duration field of the viewing progress data structure. For example, the media guidance application may retrieve (e.g., via control circuitry 604 (FIG. 6)) from a field in the entry in the viewing progress data structure a value (e.g., in minutes or rounded to the nearest minute) for the total duration of the episode stored in memory. Alternatively, the media guidance application may retrieve (e.g., via control circuitry 604 (FIG. 6)) the total duration for the episode from media guidance data source 718.

Process 1200 continues to 1218, where the media guidance application adds (e.g., via control circuitry 604 (FIG. 6)) the number of minutes of the episode stored to the variable for total length stored. For example, the media guidance application adds (e.g., via control circuitry 604 (FIG. 6)) the total duration in minutes of the episode to the stored total length and stores the new value (e.g., in storage 608).

Process 1200 continues to 1220, where the media guidance application determines (e.g., via control circuitry 604 (FIG. 6)) whether there are any additional entries in the viewing progress data structure. For example, the media guidance application may execute (e.g., via control circuitry 604 (FIG. 6)) a program script containing a "for" loop that iteratively processes all entries in the viewing progress data structure and terminates when all entries have been checked. Alternatively or additionally, the media guidance application may maintain a list of entries (e.g., in storage 608 (FIG. 6)) that have been retrieved and determine whether any other entries in the viewing progress data structure have not yet been retrieved.

If the media guidance application determines there are additional entries in the viewing progress data structure, process 1200 returns to 1208, where the media guidance application retrieves (e.g., via control circuitry 604 (FIG. 6)) an entry from the viewing progress data structure. For example, as discussed above, the media guidance application may continue to retrieve (e.g., via control circuitry 604 (FIG. 6)) entries until each entry has been checked to see whether it contains viewing progress for an episode of the series.

If the media guidance application determines there are not additional entries in the viewing progress data structure, process 1200 continues to 1222, where the media guidance application calculates (e.g., via control circuitry 604 (FIG. 6)) the aggregated viewing progress by dividing the value stored in the variable for total minutes viewed by the value stored in the variable for total length stored. For example, the media guidance application may determine (e.g., via control circuitry 604 (FIG. 6)) that the total minutes viewed by the user of a series is 550 minutes and the total length stored is 1000 minutes. In this example, the media guidance application calculates (e.g., via control circuitry 604 (FIG. 6)) an aggregated viewing progress of 55%.

Figure 13:
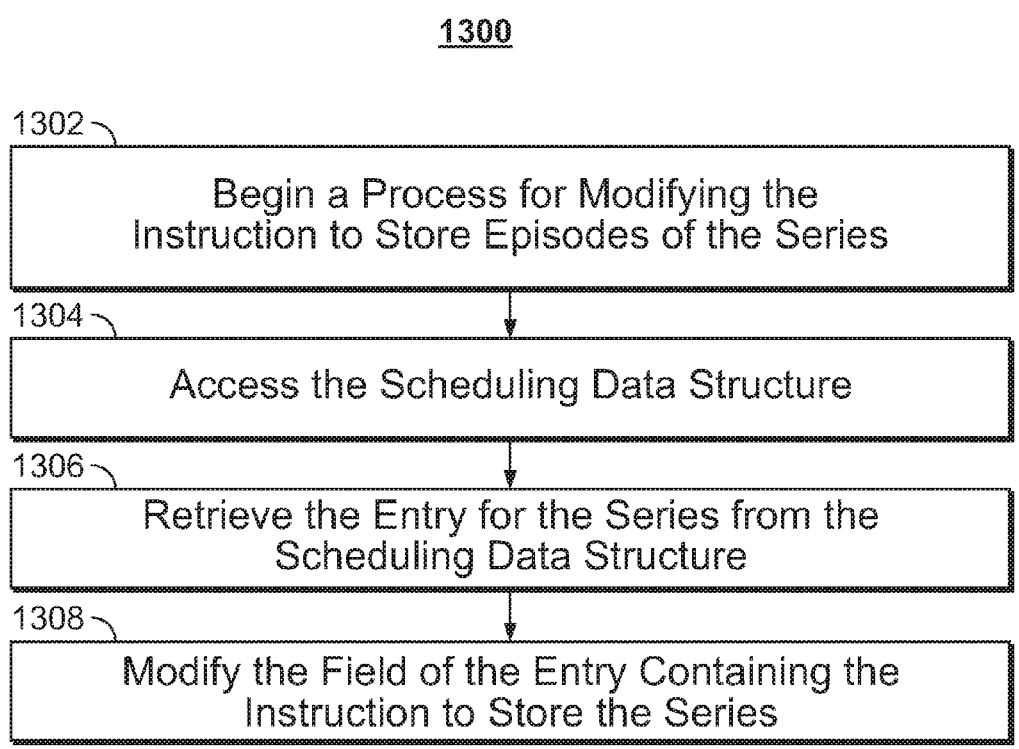
FIG. 13 is a flowchart of illustrative steps for modifying the instruction to store episodes of the series, in accordance with some embodiments of the disclosure.

FIG. 13 is a flowchart of illustrative steps for modifying the instruction to store episodes of the series, in accordance with some embodiments of the disclosure. For example, a media guidance application implementing process 1300 may be executed by control circuitry 604 (FIG. 6). It should be noted that process 1300 or any step thereof could be performed on, or provided by, any of the devices shown in FIGS. 6-7. Process 1300 starts at 1302, where the media guidance application begins (e.g., via control circuitry 604 (FIG. 6)) a process for modifying the instruction to store episodes of the series. For example, the media guidance application may initialize the necessary variables and execute (e.g., via control circuitry 604 (FIG. 6)) a program script calling a particular method to execute process 1300.

Process 1300 continues to 1304, where the media guidance application accesses (e.g., via control circuitry 604 (FIG. 6)) the scheduling data structure. For example, the media guidance application may access (e.g., via control circuitry 604 (FIG. 6)) the scheduling data structure in memory (e.g., stored locally in memory (e.g., storage 508), or remotely at a media guidance data source (e.g., media guidance data source 718) accessible via a communications network (e.g., communications network 714)).

Process 1300 continues to 1306, where the media guidance application retrieves (e.g., via control circuitry 604 (FIG. 6)) the entry for the series from the scheduling data structure. For example, the media guidance application may execute (e.g., via control circuitry 604 (FIG. 6)) a program script which selects and retrieves the entry in the scheduling data structure for the series (e.g., a row that contains the instruction to store the series).

Process 1300 continues to 1308, where the media guidance application modifies (e.g., via control circuitry 604 (FIG. 6)) the field of the entry containing the instruction to store the series. For example, the media guidance application may modify the instruction by writing an additional instruction narrowing which episodes are stored (e.g., only "new episodes") or by deleting the instruction to store episodes of the series, as described further below.

In some embodiments, the media guidance application accesses (e.g., via control circuitry 604 (FIG. 6)) the scheduling data structure. For example, the media guidance application may access the scheduling data structure stored in storage (e.g., storage 608), or remotely at a media guidance data source (e.g., media guidance data source 718) accessible via a communications network (e.g., communications network 714). The media guidance application may be required to transmit (e.g., via control circuitry 604 (FIG. 6)) an authorization code, which may be obtained from user input, in order to access the scheduling data structure. The media guidance application then stores (e.g., in storage 608)

an additional instruction to store a subset of episodes of the series. For example, the media guidance application may execute (e.g., via control circuitry 604 (FIG. 6)) a program script which writes, to a field in the row in the scheduling data structure for a specific instruction to store episodes of the series, an additional instruction to store a subset of episodes. The subset may be every other episode, only new episodes, only high-definition episodes, or any other grouping that does not include every episode of the series that is received by the media guidance application.

In other embodiments, the media guidance application accesses (e.g., via control circuitry 604 (FIG. 6)) the scheduling data structure. For example, as described above, the media guidance application may access (e.g., via control circuitry 604 (FIG. 6)) the scheduling data structure stored locally in memory or remotely at a media guidance data source. The media guidance application then deletes (e.g., via control circuitry 604 (FIG. 6)) the instruction to store episodes of the series. For example, the media guidance application may execute (e.g., via control circuitry 604 (FIG. 6)) a program script which deletes the row in the scheduling data structure for a specific instruction to store episodes of the series.

After deleting the instruction to store episodes of the series, the media guidance application may additionally retrieve (e.g., via control circuitry 604 (FIG. 6)) the current playback progress for each stored episode of the plurality of stored episodes from a viewing progress data structure of the user profile. For example, the media guidance application may access (e.g., via control circuitry 604 (FIG. 6)) a data structure in the user profile containing the viewing progress of a user for a plurality of media assets (e.g., arranged in a table) and retrieve the playback progress for each episode identified as part of the series (e.g., from a series field listing a series identifier for the episode).

The media guidance application then ranks (e.g., via control circuitry 604 (FIG. 6)) the plurality of stored episodes based on the retrieved current playback progress of each stored episode. For example, as the media guidance application retrieves (e.g., via control circuitry 604 (FIG. 6)) the playback progress for each episode (e.g., by executing a program script utilizing a "for-loop" to check the contents of each consecutive row in the table to see whether it is an episode of the series) the media guidance application may store (e.g., in storage 608) the retrieved viewing progress for each episode in a data structure with only episodes of the series (e.g., an array, list, table, etc.). Either while retrieving or after retrieving the viewing progress for the episodes of the series, the media guidance application may sort (e.g., via control circuitry 604 (FIG. 6)) the contents of the data structure with only episodes of the series using any sorting algorithm (e.g., "merge sort") such that they are ordered based on the viewer's progress in each episode (e.g., an episode the user has watched 10 minutes of will be ranked higher than an episode the user has completed). The media guidance application then deletes (e.g., via control circuitry 604 (FIG. 6)) a first stored episode based on the ranking. For example, the media guidance application may delete (e.g., via control circuitry 604 (FIG. 6)) an episode corresponding to the first or last entry of the ranked data structure containing only episodes of the series, depending on how the viewing progresses were ranked. In this way, the media guidance application can selectively delete the episode that has either been viewed the most or the least by the user from the storage device.

Additionally, the media guidance application may calculate (e.g., via control circuitry 604 (FIG. 6)) a new amount of available storage remaining on the storage device based on deleting the first stored episode. For example, as described above, the media guidance application may determine (e.g., via control circuitry 604 (FIG. 6)) how many blocks of memory are free and available to store media assets. The media guidance application may then calculate a second threshold viewing progress by processing the new amount of available storage with the series viewing function. For example, as described above, the media guidance application may store (e.g., in storage 608) a mathematical function that relates the amount of available storage to a threshold viewing progress. The media guidance application may input (e.g., via control circuitry 604 (FIG. 6)) the new amount of storage available into a program script which operates on the input with the mathematical function and returns the second threshold viewing progress. The media guidance application may then determine (e.g., via control circuitry 604 (FIG. 6)) whether the aggregated viewing progress exceeds the second threshold viewing progress. For example, as described above, the media guidance application may compare values for the aggregated viewing progress and the second threshold viewing progress to determine (e.g., via control circuitry 604 (FIG. 6)) whether the aggregated viewing progress exceeds the second threshold (e.g., by subtracting one value from the other and determining whether the result returned is positive, negative, or zero). The media guidance application may then, in response to determining the aggregated viewing progress does not exceed the second threshold viewing progress, delete (e.g., via control circuitry 604 (FIG. 6)) a second stored episode based on the ranking. For example, the media guidance application may delete (e.g., via control circuitry 604 (FIG. 6)) a second episode corresponding to the first or last entry of the ranked data structure containing only episodes of the series, depending on how the viewing progresses were ranked. In some embodiments, the media guidance application may continue to delete episodes from storage based on the ranked list until the media guidance application determines (e.g., via control circuitry 604 (FIG. 6)) the aggregated viewing progress exceeds a calculated threshold.

In some embodiments, the media guidance application generates for display (e.g., via control circuitry 604 (FIG. 6)) a notification indicating the aggregated viewing progress of the user including an option to modify the instruction to store episodes of the series. For example, the media guidance application may generate for display (e.g., via control circuitry 604 (FIG. 6)) on a television that the user has only viewed 25% of the episodes of a particular series and may additionally present options to modify the instruction. The options to modify the instruction may include an option to delete the instruction to store episodes of the series, an option to delete episodes the user has watched (e.g., either watched a certain percentage of or accessed), and/or an option to record only a subset of the series, as described above. The media guidance application receives a user selection by the user of the option. For example, the media guidance application may receive (e.g., via control circuitry 604 (FIG. 6)) a user selection, via user input interface 610, of the option to delete the instruction. In some embodiments, the user can select multiple options to allow for greater flexibility in how the finite amount of storage on the storage device is used. For example, the user may select to delete episodes they have watched 50% of, as well as to only store new episodes of the series. The media guidance application then modifies the instruction to store episodes of the series based on the received user selection. For example, as described above, the media guidance application may access (e.g., via control circuitry 604 (FIG. 6)) the scheduling data structure and write (e.g., by executing a program script) a new instruction (e.g., into a field of the row for the existing instruction) based on the received user selection.

It is contemplated that the steps or descriptions of each of FIGS. 1 and 8-13 may be used with any other embodiment of this disclosure. In addition, the steps and descriptions described in relation to FIGS. 1 and 8-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 2-7 could be used to perform one or more of the steps in FIGS. 1 and 8-13.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for modifying scheduled storage of a series as a function of available storage, the method comprising:
    receiving a user request to store the series;
    storing an instruction to store episodes of the series in a scheduling data structure;
    based on the instruction to store episodes of the series, storing copies of a plurality of episodes of the series on a storage device;
    storing viewing progress representing, for each respective copy of the copies of the plurality of episodes, an amount of the respective copy that the user has played back in a user profile corresponding to the user;
    determining an amount of available storage remaining on the storage device;
    calculating a threshold viewing progress by processing the amount of available storage with a series viewing function;
    computing an aggregated viewing progress representing a collective viewing progress among the plurality of stored episodes by summing each amount of the respective copy;
    determining whether the aggregated viewing progress exceeds the threshold viewing progress; and
    in response to determining the aggregated viewing progress does not exceed the threshold viewing progress, deleting the instruction to store episodes of the series thereby canceling the recording of future episodes of the series.

2. The method of claim 1, wherein storing the viewing progress of the plurality of episodes by the user in the user profile comprises:
    determining the user has selected a first episode of the plurality of episodes;
    monitoring a current playback position of the user for the first episode; and
    storing the current playback position of the user for the first episode as an entry in a viewing progress data structure of the user profile.

3. The method of claim 2, wherein storing the current playback position of the user for the first episode as the entry in the viewing progress data structure of the user profile comprises:
    calculating a fraction of the first episode viewed by the user based on a duration of the first episode and the current playback position of the user;
    retrieving a threshold fractional viewing progress stored in memory;
    comparing the fraction of the first episode viewed by the user to the threshold fractional viewing progress; and
    in response to determining the fraction of the first episode viewed by the user meets the threshold fractional viewing progress, storing with the entry an indication that the first episode has been completely viewed by the user.

4. The method of claim 1, wherein calculating the threshold viewing progress by processing the amount of available storage with the series viewing function comprises:
    retrieving a first value of the amount of available storage;
    executing a program script, wherein the first value is input to a mathematical function mapping values for the amount of available storage to threshold viewing progresses; and
    receiving, as an output of the program script, the threshold viewing progress.

5. The method of claim 1, wherein computing the aggregated viewing progress representing the collective viewing progress among the plurality of stored episodes comprises:
    calculating an aggregated duration of stored episodes of the series by summing a duration of each stored episode of the plurality of stored episodes of the series;
    calculating the collective viewing progress by summing a current playback progress of the user of each stored episode of the plurality of stored episodes of the series; and
    calculating the aggregated viewing progress by dividing the collective viewing progress by the aggregated duration of stored episodes.

6. The method of claim 1, further comprising:
    retrieving the current playback progress for each stored episode of the plurality of stored episodes from a viewing progress data structure of the user profile;
    ranking the plurality of stored episodes based on the retrieved current playback progress of each stored episode; and
    deleting a first stored episode based on the ranking.

7. The method of claim 6, further comprising:
    calculating a new amount of available storage remaining on the storage device based on deleting the first stored episode;
    calculating a second threshold viewing progress by processing the new amount of available storage with the series viewing function;
    determining whether the aggregated viewing progress exceeds the second threshold viewing progress; and
    in response to determining the aggregated viewing progress does not exceed the second threshold viewing progress, deleting a second stored episode based on the ranking.

8. A system for modifying scheduled storage of a series as a function of available storage, the system comprising:
  storage circuitry configured to:
    store an instruction to store copies of episodes of the series in a scheduling data structure;
    store viewing progress representing, for each respective copy of the copies of the plurality of episodes, an amount of the respective copy that the user has played back in a user profile corresponding to the user; and
    based on the instruction to store episodes of the series, store the copies of the plurality of episodes of the series on a storage device; and
  control circuitry configured to:
    receive a user request to store the series;
    determine an amount of available storage remaining on the storage device;
    calculate a threshold viewing progress by processing the amount of available storage with a series viewing function;
    compute an aggregated viewing progress representing a collective viewing progress among the plurality of stored episodes by summing each amount of the respective copy;
    determine whether the aggregated viewing progress exceeds the threshold viewing progress; and
    in response to determining the aggregated viewing progress does not exceed the threshold viewing progress, delete the instruction to store episodes of the series thereby canceling the recording of future episodes of the series.

9. The system of claim 8, wherein the control circuitry is further configured to:
  determine the user has selected a first episode of the plurality of episodes;
  monitor a current playback position of the user for the first episode; and
  store the current playback position of the user for the first episode as an entry in a viewing progress data structure of the user profile.

10. The system of claim 9, wherein the control circuitry configured to store the current playback position of the user for the first episode as the entry in the viewing progress data structure of the user profile is further configured to:
  calculate a fraction of the first episode viewed by the user based on a duration of the first episode and the current playback position of the user;
  retrieve a threshold fractional viewing progress stored in memory;
  compare the fraction of the first episode viewed by the user to the threshold fractional viewing progress; and
  in response to determining the fraction of the first episode viewed by the user meets the threshold fractional viewing progress, store with the entry an indication that the first episode has been completely viewed by the user.

11. The system of claim 8, wherein the control circuitry configured to calculate the threshold viewing progress by processing the amount of available storage with the series viewing function is further configured to:
  retrieve a first value of the amount of available storage;
  execute a program script, wherein the first value is input to a mathematical function mapping values for the amount of available storage to threshold viewing progresses; and
  receive, as an output of the program script, the threshold viewing progress.

12. The system of claim 8, wherein the control circuitry configured to compute the aggregated viewing progress representing the collective viewing progress among the plurality of stored episodes is further configured to:
  calculate an aggregated duration of stored episodes of the series by summing a duration of each stored episode of the plurality of stored episodes of the series;
  calculate the collective viewing progress by summing a current playback progress of the user of each stored episode of the plurality of stored episodes of the series; and
  calculate the aggregated viewing progress by dividing the collective viewing progress by the aggregated duration of stored episodes.

13. The system of claim 8, wherein the control circuitry is further configured to:
  retrieve the current playback progress for each stored episode of the plurality of stored episodes from a viewing progress data structure of the user profile;
  rank the plurality of stored episodes based on the retrieved current playback progress of each stored episode; and
  delete a first stored episode based on the ranking.

14. The system of claim 13, wherein the control circuitry is further configured to:
  calculate a new amount of available storage remaining on the storage device based on deleting the first stored episode;
  calculate a second threshold viewing progress by processing the new amount of available storage with the series viewing function;
  determine whether the aggregated viewing progress exceeds the second threshold viewing progress; and
  in response to determining the aggregated viewing progress does not exceed the second threshold viewing progress, delete a second stored episode based on the ranking.

* * * * *